United States Patent
Palin et al.

(10) Patent No.: US 9,473,941 B1
(45) Date of Patent: Oct. 18, 2016

(54) METHOD, APPARATUS, AND COMPUTER PROGRAM PRODUCT FOR CREATING AN AUTHENTICATED RELATIONSHIP BETWEEN WIRELESS DEVICES

(71) Applicant: Nokia Technologies Oy, Espoo (FI)

(72) Inventors: Arto Palin, Viiala (FI); Jukka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/740,467

(22) Filed: Jun. 16, 2015

(51) Int. Cl.
*H04B 7/00* (2006.01)
*H04W 12/06* (2009.01)
*H04W 8/00* (2009.01)
*H04W 4/00* (2009.01)

(52) U.S. Cl.
CPC .............. *H04W 12/06* (2013.01); *H04W 4/008* (2013.01); *H04W 8/005* (2013.01)

(58) Field of Classification Search
CPC ... H04W 84/18; H04W 88/06; H04W 76/02; H04W 12/06; H04W 12/12; H04W 12/08; H04W 88/02; H04M 1/7253; H04M 2250/02
USPC ........ 455/41.2, 411; 380/247, 270; 713/168; 726/3
See application file for complete search history.

(56) References Cited

U.S. PATENT DOCUMENTS

| | | |
|---|---|---|
| 7,194,760 B2 | 3/2007 | Nordman et al. |
| 8,621,203 B2 | 12/2013 | Ekberg et al. |
| 2006/0036855 A1 | 2/2006 | Simonen |
| 2006/0253424 A1* | 11/2006 | Huang .................. H04L 9/0844 |
| 2008/0044012 A1 | 2/2008 | Ekberg et al. |
| 2010/0325427 A1 | 12/2010 | Ekberg et al. |
| 2012/0295587 A1* | 11/2012 | Paya .................. H04L 63/0492 455/411 |
| 2013/0067552 A1* | 3/2013 | Hawkes ................ H04L 63/166 726/7 |

* cited by examiner

*Primary Examiner* — Nhan Le
(74) *Attorney, Agent, or Firm* — Locke Lord LLP

(57) ABSTRACT

In an example embodiment, a method for authentication of a wireless device without making a connection, includes transmitting, by an apparatus, wireless device discovery messages including a nonce for authenticating wireless devices responding to the wireless device discovery messages; receiving, by the apparatus, a wireless response message from another wireless device responding to the wireless device discovery messages, the wireless response message including an authentication test value based on the nonce; and authenticating, by the apparatus, the other wireless device, without establishing a wireless connection to the other wireless device, if the authentication test value is valid.

14 Claims, 17 Drawing Sheets

EXAMPLE PROCESS
OF SCANNER
AUTHENTICATION

EXAMPLE PROCESS OF SCANNER AUTHENTICATION

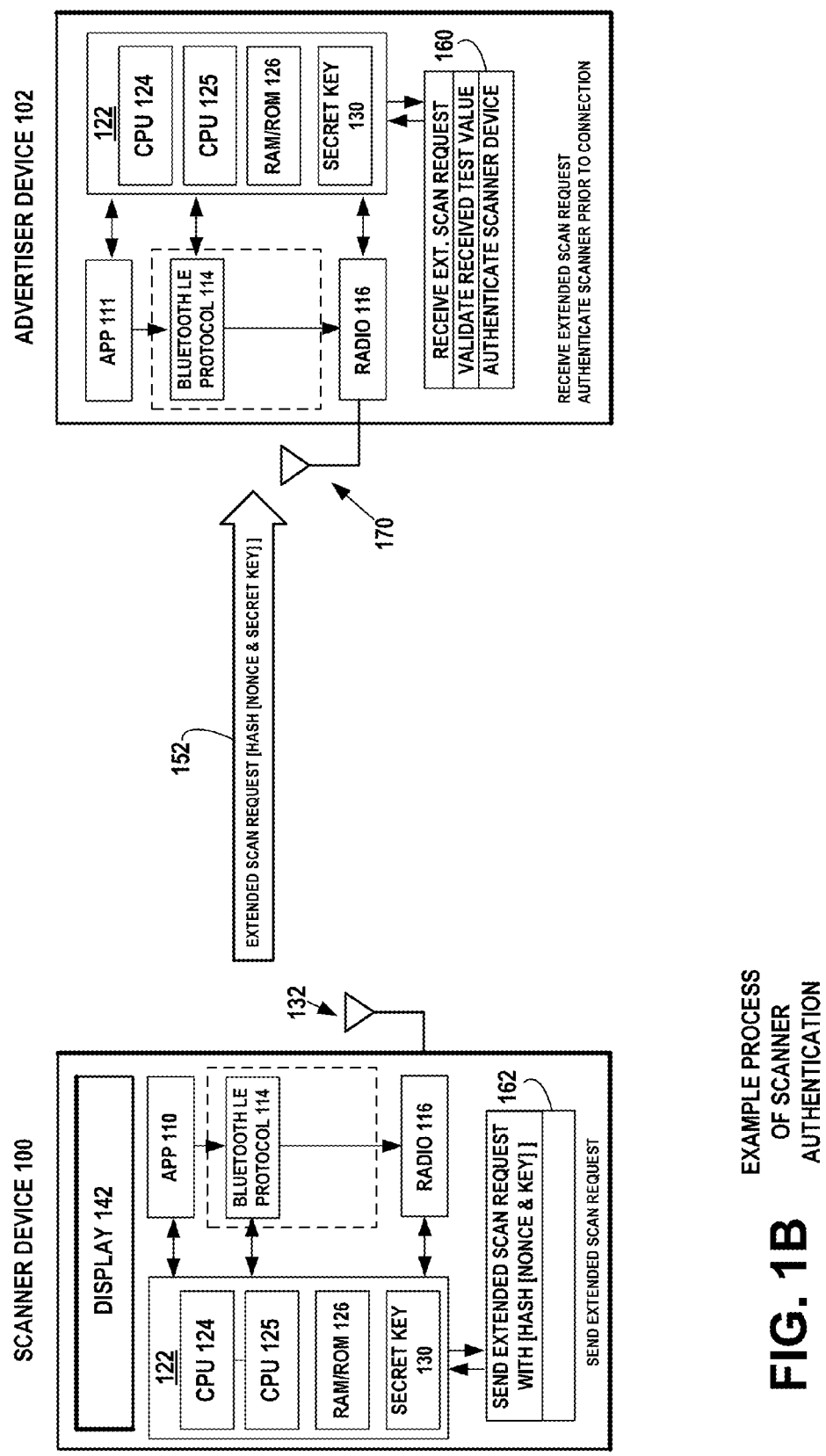
FIG. 1B   EXAMPLE PROCESS OF SCANNER AUTHENTICATION

EXAMPLE PROCESS OF ADVERTISER AUTHENTICATION

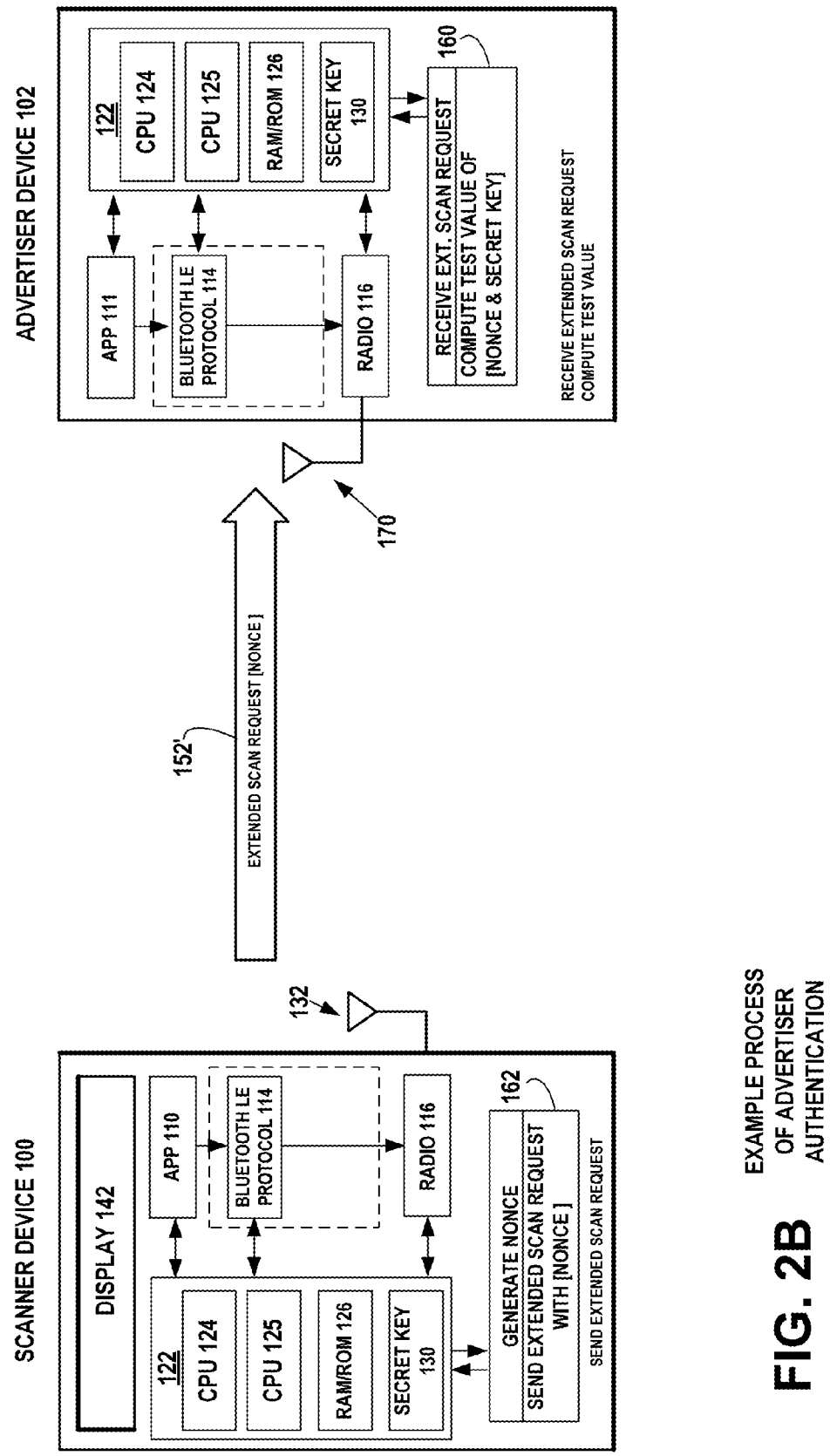
FIG. 2B  EXAMPLE PROCESS OF ADVERTISER AUTHENTICATION

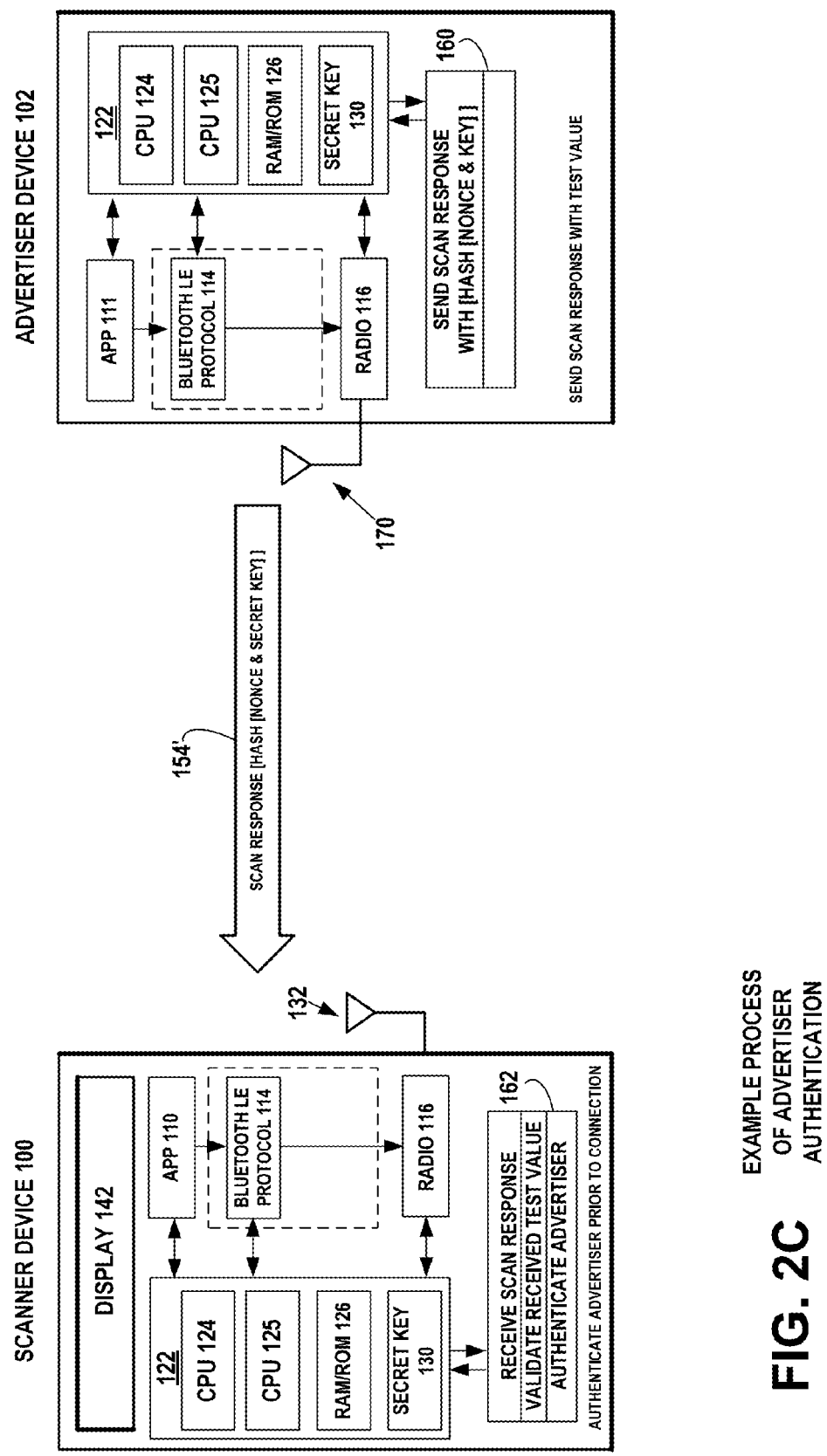
FIG. 2C  EXAMPLE PROCESS OF ADVERTISER AUTHENTICATION

EXAMPLE PROCESS OF MUTUAL AUTHENTICATION

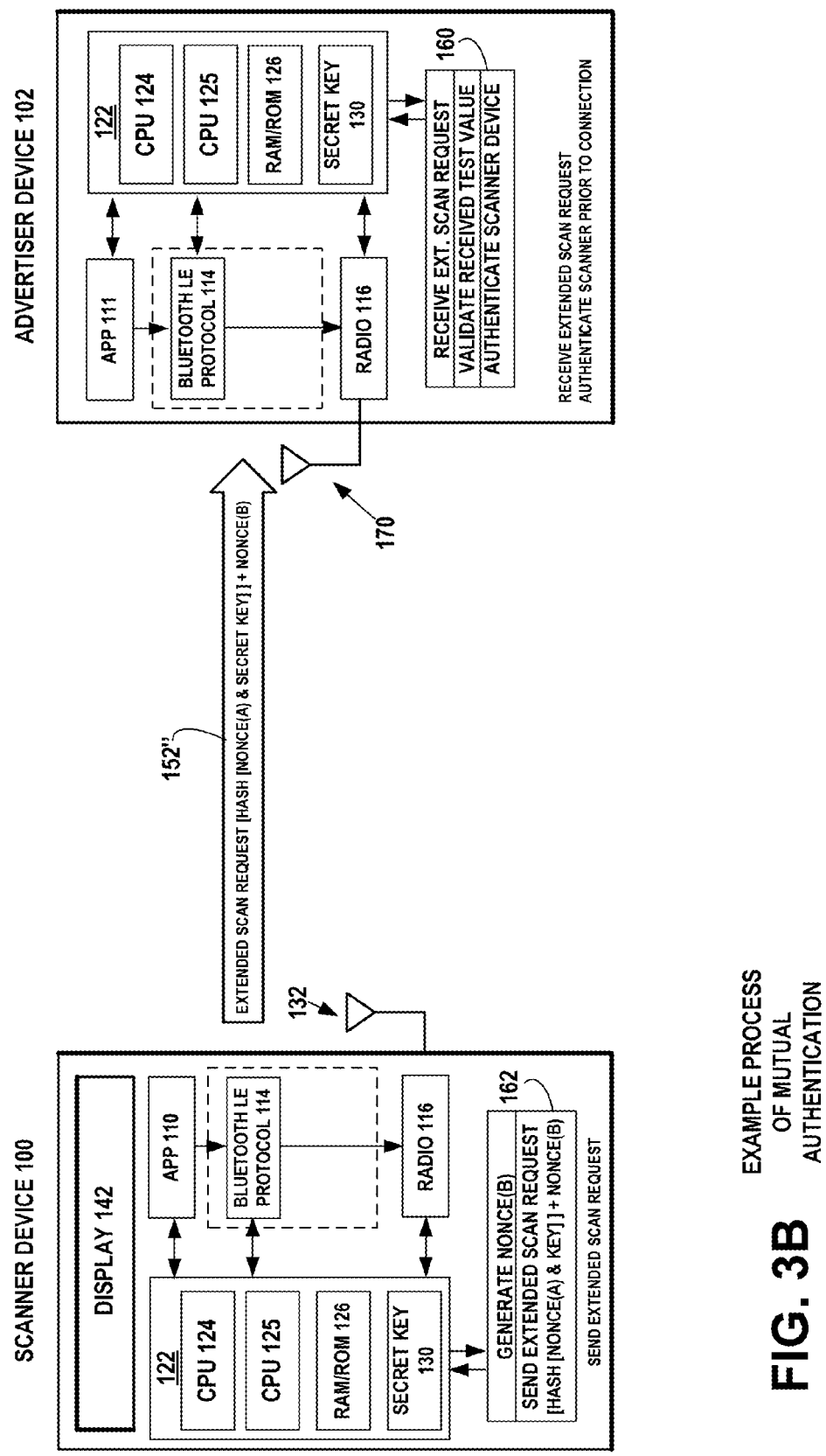
FIG. 3B  EXAMPLE PROCESS OF MUTUAL AUTHENTICATION

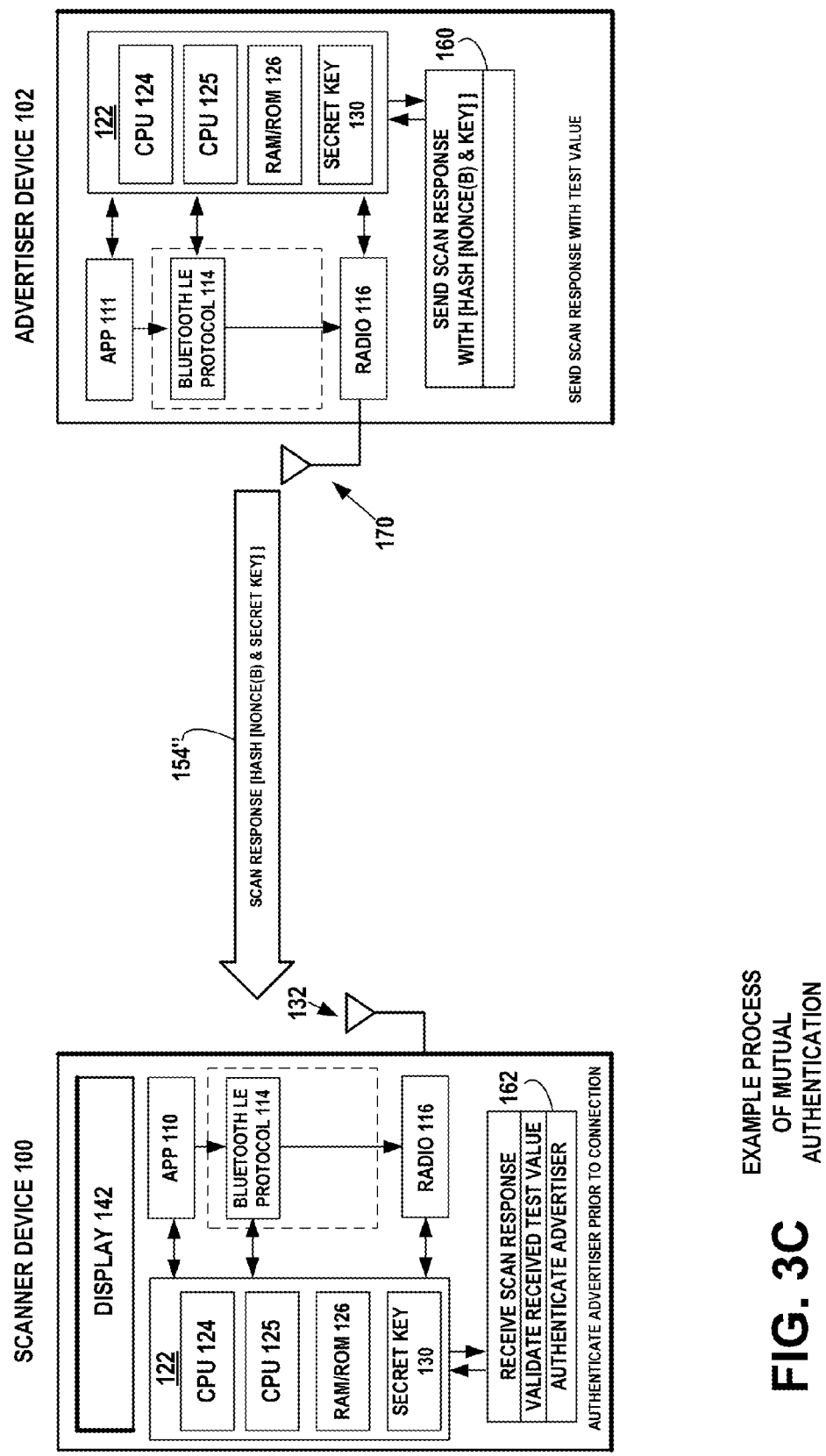
FIG. 3C  EXAMPLE PROCESS OF MUTUAL AUTHENTICATION

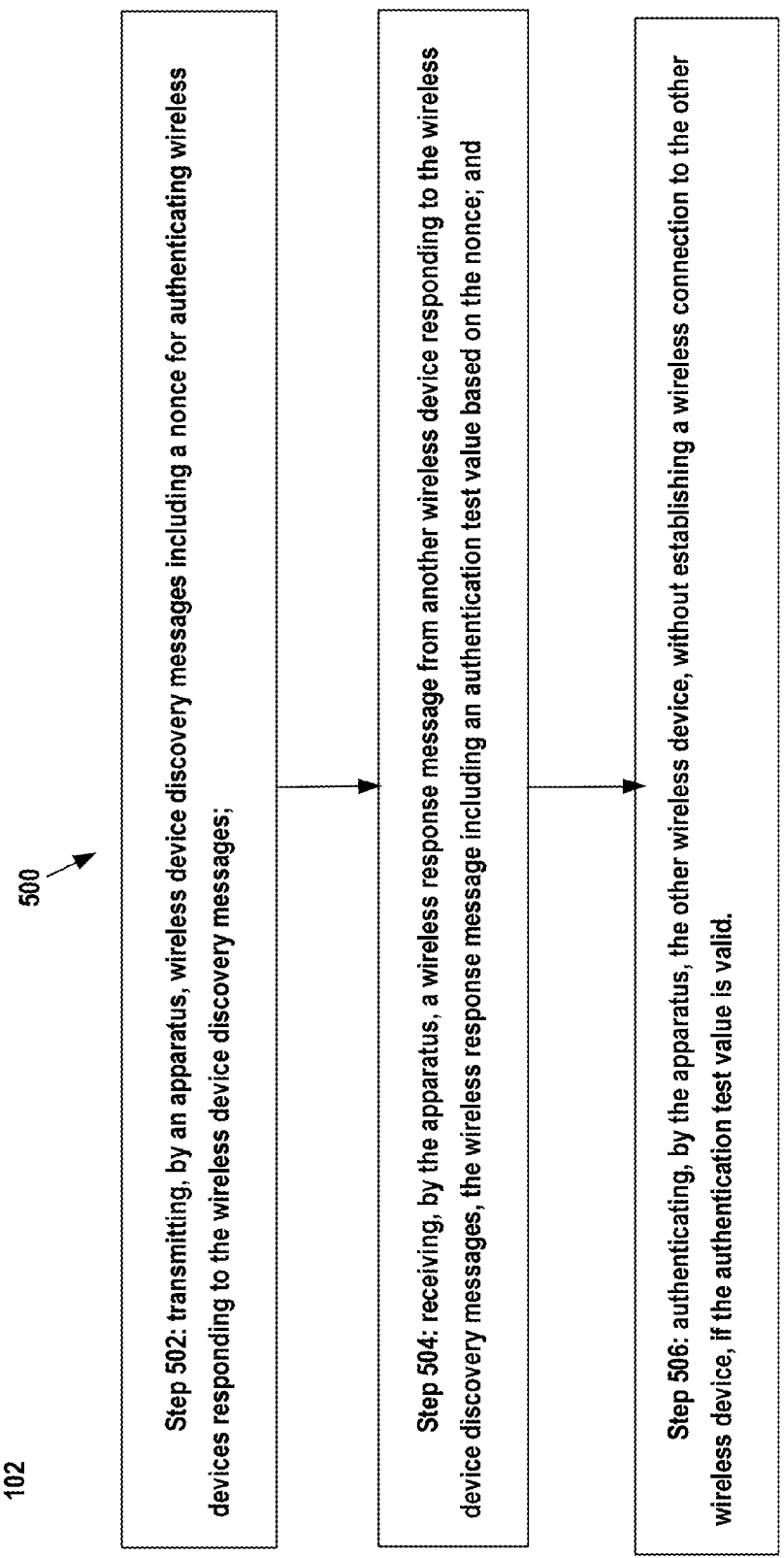

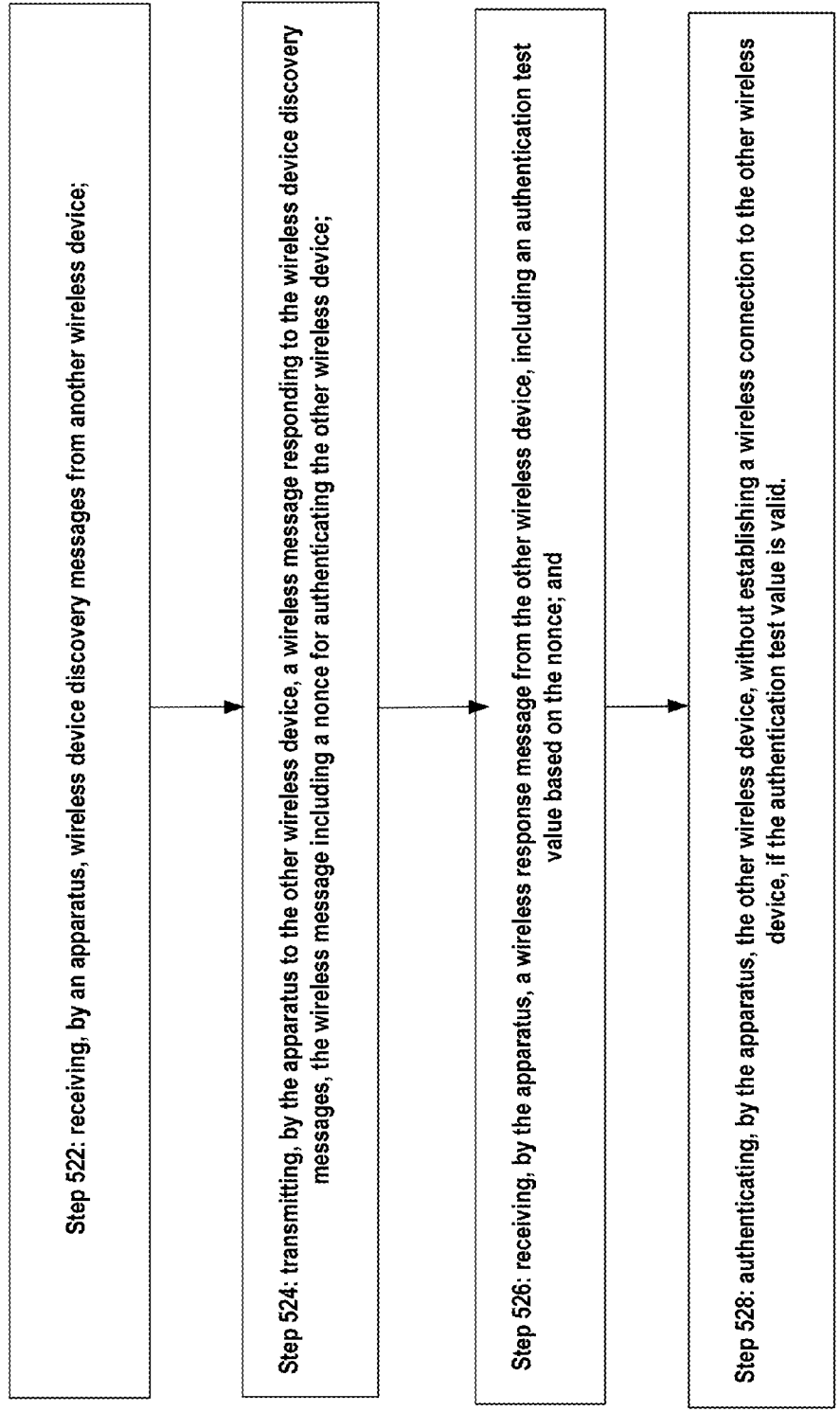

FIG. 5B
SCANNER DEVICE 100

Step 522: receiving, by an apparatus, wireless device discovery messages from another wireless device;

Step 524: transmitting, by the apparatus to the other wireless device, a wireless message responding to the wireless device discovery messages, the wireless message including a nonce for authenticating the other wireless device;

Step 526: receiving, by the apparatus, a wireless response message from the other wireless device, including an authentication test value based on the nonce; and Step 528: authenticating, by the apparatus, the other wireless device, without establishing a wireless connection to the other wireless device, if the authentication test value is valid.

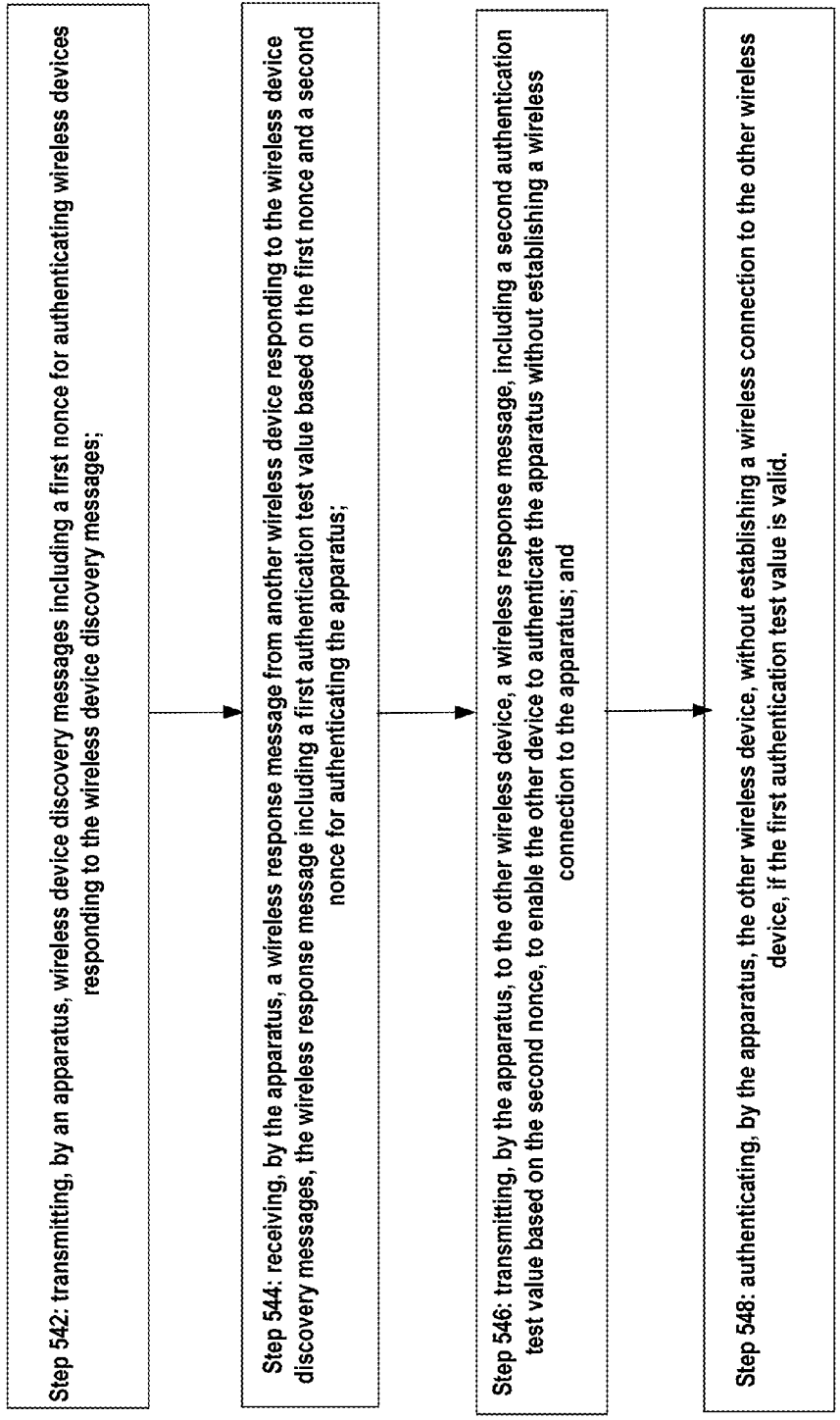

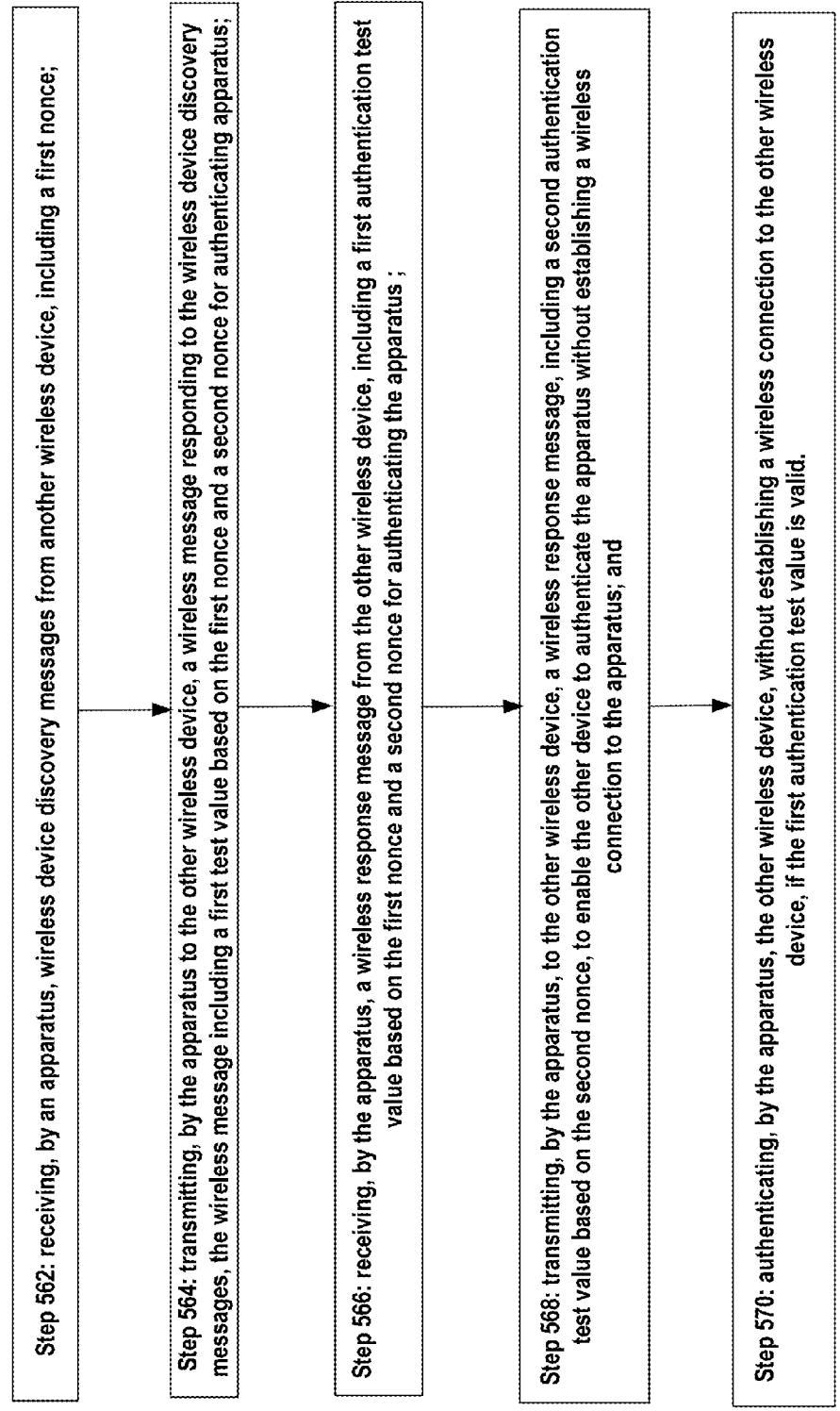

Example process of scanner authorization

METHOD, APPARATUS, AND COMPUTER PROGRAM PRODUCT FOR CREATING AN AUTHENTICATED RELATIONSHIP BETWEEN WIRELESS DEVICES

FIELD

The technology field relates to wireless device discovery, and more particularly to creating an authenticated relationship between devices before an actual connection is created.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. The Bluetooth™ Core Specification, Version 4.2, Bluetooth™ SIG, Dec. 2, 2014 (incorporated herein by reference), describes the Bluetooth™ protocol (BT) and the Bluetooth™ Low Energy protocol (BLE).

SUMMARY

Method, apparatus, and computer program product example embodiments enhance authentication of a wireless device without making a connection.

An example embodiment of the invention includes a method comprising:

transmitting, by an apparatus, wireless device discovery messages including a nonce for authenticating wireless devices responding to the wireless device discovery messages;

receiving, by the apparatus, a wireless response message from another wireless device responding to the wireless device discovery messages, the wireless response message including an authentication test value based on the nonce; and authenticating, by the apparatus, the other wireless device, without establishing a wireless connection to the other wireless device, if the authentication test value is valid.

An example embodiment of the invention includes a method comprising:

wherein the wireless device discovery messages transmitted by the wireless device are Bluetooth Low Energy advertising messages and the wireless response message from other wireless device is a Bluetooth Low Energy extended scan request.

An example embodiment of the invention includes a method comprising:

wherein the authentication test value received from the other wireless device is a received value of a combination of the nonce and a secret value shared by the wireless device and the other wireless device.

An example embodiment of the invention includes a method comprising:

computing, by the apparatus, an authentication test value based on the nonce and the shared secret value;

comparing, by the apparatus, the computed authentication test value with the received authentication test value; and authenticating, by the apparatus, the other wireless device, if the computed authentication test value compares with the received authentication test value.

An example embodiment of the invention includes a method comprising:

receiving, by an apparatus, wireless device discovery messages from another wireless device;

transmitting, by the apparatus to the other wireless device, a wireless message responding to the wireless device discovery messages, the wireless message including a nonce for authenticating the other wireless device;

receiving, by the apparatus, a wireless response message from the other wireless device, including an authentication test value based on the nonce; and authenticating, by the apparatus, the other wireless device, without establishing a wireless connection to the other wireless device, if the authentication test value is valid.

An example embodiment of the invention includes a method comprising:

wherein the wireless device discovery messages transmitted by the other wireless device are Bluetooth Low Energy advertising messages and the wireless message transmitted by the apparatus and including the nonce, is a Bluetooth Low Energy extended scan request.

An example embodiment of the invention includes a method comprising:

wherein the authentication test value received from the other wireless device is a received value of a combination of the nonce and a secret value shared by the wireless device and the other wireless device.

An example embodiment of the invention includes a method comprising:

computing, by the apparatus, an authentication test value based on the nonce and the shared secret value;

comparing, by the apparatus, the computed authentication test value with the received authentication test value; and authenticating, by the apparatus, the other wireless device, if the computed authentication test value compares with the received authentication test value.

An example embodiment of the invention includes an apparatus comprising:

at least one processor;

at least one memory including computer program code;

the at least one memory and the computer program code configured to, with the at least one processor, cause the apparatus at least to:

transmit wireless device discovery messages including a nonce for authenticating wireless devices responding to the wireless device discovery messages;

receive a wireless response message from another wireless device responding to the wireless device discovery messages, the wireless response message including an authentication test value based on the nonce; and authenticate the other wireless device, without establishing a wireless connection to the other wireless device, if the authentication test value is valid.

An example embodiment of the invention includes an apparatus comprising:

wherein the wireless device discovery messages transmitted by the wireless device are Bluetooth Low Energy advertising messages and the wireless response message from other wireless device is a Bluetooth Low Energy extended scan request.

An example embodiment of the invention includes an apparatus comprising:

wherein the authentication test value received from the other wireless device is a received value of a combination of the nonce and a secret value shared by the wireless device and the other wireless device.

An example embodiment of the invention includes an apparatus comprising:

the at least one memory and the computer program code configured to, with the at least one processor, cause the apparatus at least to:

compute an authentication test value based on the nonce and the shared secret value;

compare the computed authentication test value with the received authentication test value; and authenticate the other wireless device, if the computed authentication test value compares with the received authentication test value.

An example embodiment of the invention includes an apparatus comprising:

at least one processor;

at least one memory including computer program code;

the at least one memory and the computer program code configured to, with the at least one processor, cause the apparatus at least to:

receive wireless device discovery messages from another wireless device;

transmit to the other wireless device, a wireless message responding to the wireless device discovery messages, the wireless message including a nonce for authenticating the other wireless device;

receive a wireless response message from the other wireless device, including an authentication test value based on the nonce; and authenticate the other wireless device, without establishing a wireless connection to the other wireless device, if the authentication test value is valid.

An example embodiment of the invention includes an apparatus comprising:

wherein the wireless device discovery messages transmitted by the other wireless device are Bluetooth Low Energy advertising messages and the wireless message transmitted by the apparatus and including the nonce, is a Bluetooth Low Energy extended scan request.

An example embodiment of the invention includes an apparatus comprising:

wherein the authentication test value received from the other wireless device is a received value of a combination of the nonce and a secret value shared by the wireless device and the other wireless device.

An example embodiment of the invention includes an apparatus comprising:

wherein the authentication further comprises:

the at least one memory and the computer program code configured to, with the at least one processor, cause the apparatus at least to:

compute an authentication test value based on the nonce and the shared secret value;

compare the computed authentication test value with the received authentication test value; and authenticate the other wireless device, if the computed authentication test value compares with the received authentication test value.

An example embodiment of the invention includes a computer program product comprising computer executable program code recorded on a computer readable non-transitory storage medium, the computer executable program code comprising:

code for transmitting, by an apparatus, wireless device discovery messages including a nonce for authenticating wireless devices responding to the wireless device discovery messages;

code for receiving, by the apparatus, a wireless response message from another wireless device responding to the wireless device discovery messages, the wireless response message including an authentication test value based on the nonce; and code for authenticating, by the apparatus, the other wireless device, without establishing a wireless connection to the other wireless device, if the authentication test value is valid.

An example embodiment of the invention includes a computer program product comprising computer executable program code recorded on a computer readable non-transitory storage medium, the computer executable program code comprising:

code for receiving, by an apparatus, wireless device discovery messages from another wireless device;

code for transmitting, by the apparatus to the other wireless device, a wireless message responding to the wireless device discovery messages, the wireless message including a nonce for authenticating the other wireless device;

code for receiving, by the apparatus, a wireless response message from the other wireless device, including an authentication test value based on the nonce; and code for authenticating, by the apparatus, the other wireless device, without establishing a wireless connection to the other wireless device, if the authentication test value is valid.

An example embodiment of the invention includes a method comprising:

transmitting, by an apparatus, wireless device discovery messages including a first nonce for authenticating wireless devices responding to the wireless device discovery messages;

receiving, by the apparatus, a wireless response message from another wireless device responding to the wireless device discovery messages, the wireless response message including a first authentication test value based on the first nonce and a second nonce for authenticating the apparatus;

transmitting, by the apparatus, to the other wireless device, a wireless response message, including a second authentication test value based on the second nonce, to enable the other device to authenticate the apparatus without establishing a wireless connection to the apparatus; and authenticating, by the apparatus, the other wireless device, without establishing a wireless connection to the other wireless device, if the first authentication test value is valid.

An example embodiment of the invention includes a method comprising:

receiving, by an apparatus, wireless device discovery messages from another wireless device;

transmitting, by the apparatus to the other wireless device, a wireless message responding to the wireless device discovery messages, the wireless message including a first nonce for authenticating the other wireless device;

receiving, by the apparatus, a wireless response message from the other wireless device, including a first authentication test value based on the first nonce and a second nonce for authenticating the apparatus;

transmitting, by the apparatus, to the other wireless device, a wireless response message, including a second authentication test value based on the second nonce, to enable the other device to authenticate the apparatus without establishing a wireless connection to the apparatus; and authenticating, by the apparatus, the other wireless device, without establishing a wireless connection to the other wireless device, if the first authentication test value is valid.

An example embodiment of the invention includes an apparatus comprising:

at least one processor;

at least one memory including computer program code;

the at least one memory and the computer program code configured to, with the at least one processor, cause the apparatus at least to:

transmit wireless device discovery messages including a first nonce for authenticating wireless devices responding to the wireless device discovery messages;

receive a wireless response message from another wireless device responding to the wireless device discovery messages, the wireless response message including a first authentication test value based on the first nonce and a second nonce for authenticating the apparatus;

transmit to the other wireless device, a wireless response message, including a second authentication test value based on the second nonce, to enable the other device to authenticate the apparatus without establishing a wireless connection to the apparatus; and authenticate the other wireless device, without establishing a wireless connection to the other wireless device, if the first authentication test value is valid.

An example embodiment of the invention includes an apparatus comprising:

at least one processor;

at least one memory including computer program code;

the at least one memory and the computer program code configured to, with the at least one processor, cause the apparatus at least to:

receive wireless device discovery messages from another wireless device;

transmit to the other wireless device, a wireless message responding to the wireless device discovery messages, the wireless message including a first nonce for authenticating the other wireless device;

receive a wireless response message from the other wireless device, including a first authentication test value based on the first nonce and a second nonce for authenticating the apparatus;

transmit to the other wireless device, a wireless response message, including a second authentication test value based on the second nonce, to enable the other device to authenticate the apparatus without establishing a wireless connection to the apparatus; and authenticate the other wireless device, without establishing a wireless connection to the other wireless device, if the first authentication test value is valid.

An example embodiment of the invention includes a computer program product comprising computer executable program code recorded on a computer readable non-transitory storage medium, the computer executable program code comprising:

code for transmitting, by an apparatus, wireless device discovery messages including a first nonce for authenticating wireless devices responding to the wireless device discovery messages;

code for receiving, by the apparatus, a wireless response message from another wireless device responding to the wireless device discovery messages, the wireless response message including a first authentication test value based on the first nonce and a second nonce for authenticating the apparatus;

code for transmitting, by the apparatus, to the other wireless device, a wireless response message, including a second authentication test value based on the second nonce, to enable the other device to authenticate the apparatus without establishing a wireless connection to the apparatus; and code for authenticating, by the apparatus, the other wireless device, without establishing a wireless connection to the other wireless device, if the first authentication test value is valid.

An example embodiment of the invention includes a computer program product comprising computer executable program code recorded on a computer readable non-transitory storage medium, the computer executable program code comprising:

code for receiving, by an apparatus, wireless device discovery messages from another wireless device;

code for transmitting, by the apparatus to the other wireless device, a wireless message responding to the wireless device discovery messages, the wireless message including a first nonce for authenticating the other wireless device;

code for receiving, by the apparatus, a wireless response message from the other wireless device, including a first authentication test value based on the first nonce and a second nonce for authenticating the apparatus;

code for transmitting, by the apparatus, to the other wireless device, a wireless response message, including a second authentication test value based on the second nonce, to enable the other device to authenticate the apparatus without establishing a wireless connection to the apparatus; and code for authenticating, by the apparatus, the other wireless device, without establishing a wireless connection to the other wireless device, if the first authentication test value is valid.

DESCRIPTION OF THE FIGURES

FIG. 1B is an illustration of an example embodiment of the network of FIG. 1A, wherein the wireless scanner device computes an authentication test value that is based on output of the security function utilizing at least a combination of the nonce and a secret value shared by the wireless advertiser device and the wireless scanner device. The example of the authentication test value can be output of the hash function or the block cipher algorithm. The scanner device sends a wireless response message to the advertiser device, which is an extended scan request, including the authentication test value based on the nonce. The advertiser device computes an authentication test value based on at least combination of the nonce and the shared secret value. The advertiser then compares the computed authentication test value with the received authentication test value from the scanner. The advertiser can then authenticate the wireless scanner device, if the computed authentication test value compares with the received authentication test value, in accordance with at least one embodiment of the present invention.

FIG. 2B is an illustration of an example embodiment of the network of FIG. 2A, wherein the wireless scanner device is in the process of authenticating the wireless advertiser device by transmitting BLE extended scan request messages including a nonce for authenticating responding wireless devices, in accordance with at least one embodiment of the present invention. The wireless advertiser device computes an authentication test value that is an authentication test value based on the nonce and a secret value shared by the wireless advertiser device and the wireless scanner device, in accordance with at least one embodiment of the present invention.

FIG. 2C is an illustration of an example embodiment of the network of FIG. 2B, wherein the wireless advertiser device sends a scan response message including the authentication test value that is an authentication test value based on the nonce and a secret value. The scanner device computes an authentication test value based on the nonce and the shared secret value. The scanner then compares the computed authentication test value with the received authentication test value from the advertiser. The scanner can then authenticate the wireless advertiser device, if the computed authentication test value compares with the received authentication test value, in accordance with at least one embodiment of the present invention.

FIG. 3B is an illustration of an example embodiment of the network of FIG. 3A, the advertiser device receives an extended scan request message from the scanner device responding to the advertisement messages, the extended scan request message including a first authentication test value based on the first nonce and a second nonce for authenticating the advertiser. The advertiser device is shown authenticating the scanner device, without establishing a wireless connection to the other wireless device, if the first authentication test value is valid, in accordance with at least one embodiment of the present invention.

FIG. 3C is an illustration of an example embodiment of the network of FIG. 3B, wherein the advertiser device is shown transmitting to the scanner device, a scan response message, including a second authentication test value based on the second nonce, to enable the scanner device to authenticate the advertiser device without establishing a wireless connection to the advertiser device. The scanner device is shown authenticating the advertiser device, without establishing a wireless connection to the advertiser device, if the second authentication test value is valid, in accordance with at least one embodiment of the present invention.

FIG. 5A is an illustration of an example flow diagram 500 of an example process in the wireless advertiser device 102, carrying out the example operations, in accordance with at least one embodiment of the present invention.

FIG. 5B is an illustration of an example flow diagram 520 of an example process in the wireless scanner device 100, carrying out the example operations, in accordance with at least one embodiment of the present invention.

FIG. 5C is an illustration of an example flow diagram 540 of an example process in the wireless advertiser device 102, carrying out mutual authentication operations with the scanner device 100, in accordance with at least one embodiment of the present invention.

FIG. 5D is an illustration of an example flow diagram 560 of an example process in the wireless scanner device 100, carrying out mutual authentication operations with the advertiser device 102, in accordance with at least one embodiment of the present invention.

Figure 1A:
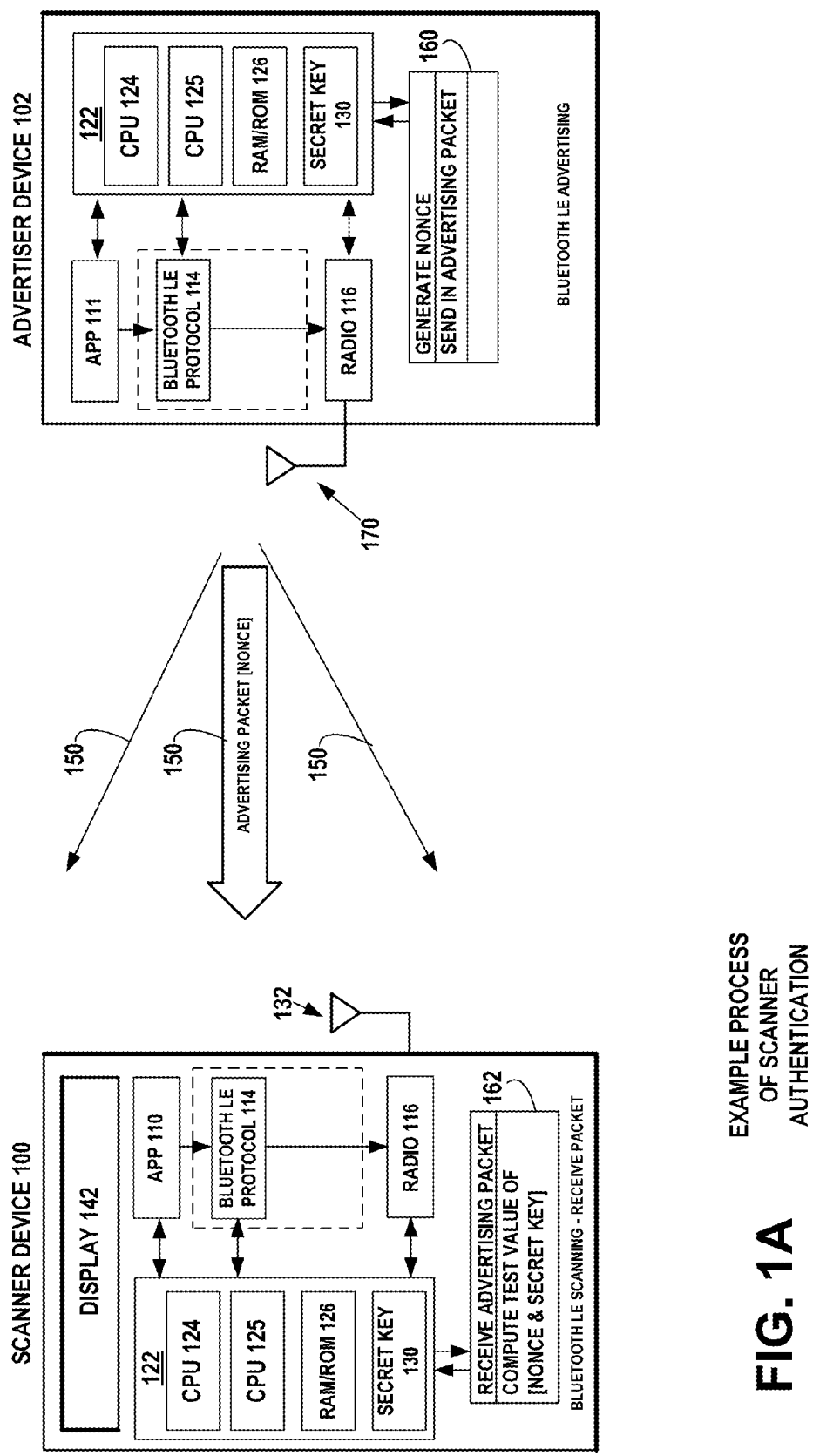
FIG. 1A is an illustration of an example embodiment of a network with an example wireless advertiser device and a wireless scanner device. The wireless scanner device is shown scanning for Bluetooth™ Low Energy protocol (BLE) advertising messages. The wireless advertiser device is in the process of authenticating the wireless scanner device by transmitting BLE advertising messages including a nonce for authenticating wireless devices responding to the advertising messages, in accordance with at least one embodiment of the present invention.

DISCUSSION OF EXAMPLE EMBODIMENTS
OF THE INVENTION

This section is organized into the following topics:
A. Wireless Short-Range Communication Networks
B. Bluetooth™ Low Energy (BLE) Technology
C. Creating an Authenticated Relationship Between Wireless Devices A. Wireless Short-Range Communication Networks Short-range communication technologies provide communication solutions appropriate for many data applications, without the cost, traffic and legislative concerns of longerrange communication technologies. Popular short-range communication technologies include Bluetooth basic rate/enhanced data rate (BR/EDR), Bluetooth Low Energy (BLE), IEEE 802.11 wireless local area network (WLAN), IEEE 802.15.4, and near field communication technologies, such as radio frequency identification (RFID) and near field communication (NFC) technology that enable contactless identification and interconnection of wireless devices. Bluetooth Technology provides an example of wireless short-range communication establishment.

B. Bluetooth™ Low Energy (BLE) Technology

The Bluetooth™ Core Specification, Version 4.2 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, separated by 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Bluetooth Basic Rate/Enhanced Data Rate (BR/EDR) radio. Bluetooth LE supports very short data packets, from 10 octets to a maximum of 265 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.2, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

In the Bluetooth™ Core Specification, Version 4.2, the initiator device receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.2, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth™ Specification Version 4.2, Bluetooth LE device discovery involves different operational processes for devices with different roles. In particular:

Advertiser device performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Scanner device performs the scanning process. A scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONNECT_REQ" to establish a connection with that advertiser. For a scanner, it can send out a "SCAN_REQ" to ask for more information from that advertiser.

The CONNECT_REQ PDU has a payload field that consists of InitA, AdvA and LLData fields. The InitA field contains the Initiator's public or random device address, as indicated by a transmit address flag. The AdvA field contains the advertiser's public or random device address, as indicated by a receive address flag. The LLData consists of 10 fields, such as the Link Layer connection's Access Address, a channel map, a hop count increment, and other parameters needed to set up the connection.

The SCAN_REQ PDU has a payload field that consists of ScanA and AdvA fields. The ScanA field contains the scanner's public or random device address, as indicated by a transmit address flag. The AdvA field is the address of the device to which this PDU is addressed and contains the advertiser's public or random device address, as indicated by a receive address flag.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ LE Discovery:

At the start of each advertising event, the advertiser sends an advertising packet corresponding to the advertising event type. Depending on the type of advertising packet, the scanner may make a request to the advertiser on the same advertising PHY channel, which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

Initiator devices that are trying to form a connection to another device listen for connectable advertising packets. If the advertiser is using a connectable advertising event, an initiator may make a connection request using the same advertising PHY channel on which it received the connectable advertising packet. The advertising event is ended and connection events begin if the advertiser receives and accepts the request for a connection is initiated. Once a connection is established, the initiator becomes the master device in a piconet and the advertising device becomes the slave device. Connection events are used to send data packets between the master and slave devices.

Devices are identified using a device address. Device addresses may be either a public device address or a random device address. A public device address and a random device address are both 48 bits in length. A device shall contain at least one type of device address and may contain both.

The public device address shall be created in accordance with section 9.2 ("48-bit universal LAN MAC addresses") of the IEEE 802-2001 standard (http://standards.ieee.org/getieee802/download/802-2001.pdf) and using a valid Organizationally Unique Identifier (OUI) obtained from the IEEE Registration Authority (http://standardsleee.org/regauth/oui/forms/and sections 9 and 9.1 of the IEEE 802-2001 specification).

The public device address is divided into the following two fields:
  company_assigned field is contained in the 24 least significant bits
  company_id field is contained in the 24 most significant bits.

For the purposes of this profile, the random device address may be of either of the following two sub-types:
  Static address
  Private address The private address may be of either of the following two sub-types:
  Non-resolvable private address
  Resolvable private address Static and non-resolvable private address both contains address that is random. The main difference is that the device shall not change its static address value once initialized until the device is power cycled.

The random resolvable private device address is divided into the following two fields which can be used to identify the device:
  hash field is contained in the 24 least significant bits, as defined in Bluetooth™ Core Specification, Version 4.2 [Vol. 3] Part C, Section 10.8.2.3.
  random field is contained in the 24 most significant bits, as defined in Bluetooth™ Core Specification, Version 4.2 [Vol. 3] Part C, Section 10.8.2.2.

2. Bluetooth™ LE Link Layer Security a. Authorization

In a Bluetooth LE (BLE) connection authorization, a user of a Bluetooth device may grant a specific (remote) Bluetooth device access to a specific service. Authorization implies that the identity of the remote device can be verified through authentication. It is the act of granting a specific Bluetooth device access to a specific service. It may be based upon user confirmation, or given the existence of a trusted relationship. A service may require authorization before allowing access. Authorization is a confirmation by the user to continue with the procedure. Authentication does not necessarily provide authorization. Authorization may be granted by user confirmation after successful authentication. Authentication and authorization may be defined by a higher layer specification or be implementation specific.

b. Authentication and Encryption

Authentication is a generic procedure based on LMP-authentication if a link key exists or on LMP-pairing if no link key exists. LMP-authentication is an LMP level procedure for verifying the identity of a remote device. The procedure is based on a challenge-response mechanism using a random number, a secret key and the BD_ADDR of the non-initiating device. The secret key used can be a previously exchanged link key.

The Link Layer provides encryption and authentication using Counter with Cipher Block Chaining-Message Authentication Code (CCM) Mode, which shall be implemented consistent with the algorithm as defined in IETF RFC 3610 in conjunction with the AES-128 block cipher as defined in NIST Publication FIPS-197. The Link Layer connection may be either encrypted and authenticated or unencrypted and unauthenticated. In an encrypted and authenticated connection, all the Data Channel PDUs with a non-zero length Payload shall be encrypted and authenticated. Authentication is performed by appending a Message Integrity Check (MIC) field to the Payload.

c. Pairing and Bonding

LMP-pairing is a procedure that authenticates two devices, based on a PIN, and subsequently creates a common link key that can be used as a basis for a trusted relationship or a (single) secure connection. The procedure consists of the steps: creation of an initialization key (based on a random number and a PIN), creation and exchange of a common link key and LMP-authentication based on the common link key.

Bonding is a dedicated procedure for performing the first authentication, where a common link key is created and stored for future use. Trusting is the marking of a paired device as trusted. Trust marking can be done by the user, or automatically by the device (e.g. when in bondable mode) after a successful pairing.

Pairing and key distribution over a BLE physical link is defined by the Security Manager specification (Bluetooth™ Core Specification, Version 4.2 [Vol. 3], Part H Section 2.3). The pairing process may be initiated if either slave or master device request pairing to enable link encryption and possible authentication.

The purpose of bonding is to create a relation between two Bluetooth devices based on a stored security and identity information. A transport specific key distribution is performed during pairing process to share the keys which can be used to encrypt a link in future reconnections, verify signed data and random address resolution.

LE security uses the following keys and values for encryption, signing, and random addressing:

1. Identity Resolving Key (IRK) is a 128-bit key used to generate and resolve random addresses.

2. Connection Signature Resolving Key (CSRK) is a 128-bit key used to sign data and verify signatures on the receiving device.

3. Long Term Key (LTK) is a 128-bit key used to generate the contributory session key for an encrypted connection. Link Layer encryption is described in Bluetooth™ Core Specification, Version 4.2 [Vol 6] Part B, Section 5.1.3.

4. Encrypted Diversifier (EDIV) is a 16-bit stored value used to identify the LTK. A new EDIV is generated each time a unique LTK is distributed.

5. Random Number (Rand) is a 64-bit stored valued used to identify the LTK. A new Rand is generated each time a unique LTK is distributed.

In order for devices using the privacy feature to reconnect to known devices, the device addresses used when the privacy feature is enabled, private address, must be resolvable to the other devices' identity. The private address is generated using the device's identity key exchanged during the bonding procedure.

The Identity Resolving Key (IRK) is used for resolvable private address construction (see [Part C], Generic Access Profile, Section 10.8.2. A master that has received IRK from a slave can resolve that slave's random resolvable private device addresses. A slave that has received IRK from a master can resolve that master's random resolvable private device addresses. The privacy concept only protects against devices that are not part of the set to which the IRK has been given.

While a device is in the Peripheral or the Central role the device may support the Bonding procedure. While a device is in the Broadcaster or the Observer role the device shall not support the bonding procedure. The Host of the Central initiates the pairing process as defined in Bluetooth™ Core Specification, Version 4.2 [Vol. 3], Part C Section 2.1 with the Bonding_Flags set to Bonding as defined in [Vol. 3], Part H Section 3.5.1. If the peer device is in the bondable mode, the devices shall exchange and store the bonding information in the security database.

If a device has privacy enabled (as defined in Bluetooth™ Core Specification, Version 4.2, Table 10.7), the Host should send it's IRK to the peer device and request the IRK of the peer device during the pairing procedure. The Host can abort the pairing procedure if the authentication requirements are not sufficient to distribute the IRK. If the pairing procedure fails due to authentication requirements and IRK distribution was requested, the pairing procedure should be retried without requesting IRK distribution.

3. Bluetooth LE Timing in the Advertising, Scanning, and Initiator States:

a. Bluetooth LE Advertising State:

For all undirected advertising events or connectable directed advertising events used in a low duty cycle mode, the time between the start of two consecutive advertising events (T_advEvent) is computed as follows for each advertising event:

$$T\_advEvent=advInterval+advDelay$$

The advInterval shall be an integer multiple of 0.625 ms in the range of 20 ms to 10.24 s. If the advertising event type is either a scannable undirected event type or a non-connectable undirected event type, the advInterval shall not be less than 100 ms. If the advertising event type is a connectable undirected event type or connectable directed event type used in a low duty cycle mode, the advInterval can be 20 ms or greater. The advDelay is a pseudo-random value with a range of 0 ms to 10 ms generated by the Link Layer for each advertising event. Bluetooth™ Core Specification, Version 4.2, FIG. 4.1 shows an example timing diagram of advertising events perturbed in time using advDelay.

b. Bluetooth LE Scanning State:

If the advertiser receives a SCAN_REQ PDU that contains its device address from a scanner allowed by the advertising filter policy, it shall reply with a SCAN_RSP PDU on the same advertising channel index. After the SCAN_RSP PDU is sent, or if the advertising filter policy prohibited processing the SCAN_REQ PDU, the advertiser shall either move to the next used advertising channel index to send another ADV_IND PDU, or close the advertising event. Bluetooth™ Core Specification, Version 4.2, FIG. 4.3 shows an example timing diagram of a connectable undirected advertising event with SCAN_REQ and SCAN_RESP PDUs in the middle of an advertising event.

c. Bluetooth LE Initiator State and Connection Setup:

If an initiator sends the advertiser receives a CONNECT_REQ PDU that contains the advertiser's device address, and the initiator is allowed by the advertising filter policy, the Link Layer of the advertiser shall exit the Advertising State and transition to the Connection State in the Slave Role. If the advertising filter policy prohibited processing the received CONNECT_REQ PDU, the advertiser shall either move to the next used advertising channel index to send another ADV_IND PDU, or close the advertising event. Bluetooth™ Core Specification, Version 4.2, FIGS. 4.13 and 4.14 show example timing diagrams of a Connection setup 4. Challenge-Response Authentication In challenge-response authentication, one party sends a question or challenge and the other party must provide a valid answer or response to be authenticated. The simplest example of a challenge-response protocol is password authentication, where the challenge is asking for the password and the valid response is the correct password. Authentication protocols often employ a nonce as the challenge to maintain the uniqueness of every challenge-response sequence, which protects against a replay attack. An example nonce may be generated as a pseudorandom number. The value of the nonce is frequently updated and its use may not be repeated.

An authentication test value or message authentication code may be generated by cryptographically combining the nonce with a shared secret value or key. For example, the nonce may be exclusive-ORed with the shared secret value to generate an authentication test value. An authentication test value or message authentication code may also be generated with a cryptographic hash function operating on the nonce. The cryptographic hash function converts the digital string of the nonce into a fixed-length hash value, which is the authentication test value. A cryptographic hash function, such as MD5 or SHA-1, may be used in the calculation of an authentication test value. An authentication test value or message authentication code may also be generated with a block cipher algorithm operating on the nonce. The block cipher converts fixed-length groups of bits, called blocks or plaintext, to ciphertext which can be transformed back into the original plaintext using the same encryption key. The nonce can be used as an initialization vector or plaintext for block cipher algorithm. Block ciphers, such as AES-128, AES-192 and AES-256, may be used in the calculation of an authentication test value.

To authenticate another party, the sender may generate a nonce and cryptographically combine it with a shared secret key to produce an authentication test value, which the sender stores. The sender may then send the generated nonce to the other party. The other party then cryptographically combines the received nonce in the same way and with the shared secret key to produce a second copy of the authentication test value, which the other party returns to the original sender. The original sender then compares the received second copy of the authentication test value with the original sender's stored value. If the values compare, then the other party is authenticated.

C. Creating an Authenticated Relationship Between Wireless Devices

A problem in current Bluetooth Low Energy technology is that the devices must be connected before they can authenticate each other. This, however, creates a security risk to connecting device, since the other device may gain unauthorized access to information in the connecting device.

In current Bluetooth Low Energy technology, the advertiser or scanner can only check authentication of the other device after connection is made. In crowded environments, this may cause problems for the advertiser or scanner, because all devices must be connected before any of the connected devices can be authenticated. This may create the risk of a denial of services type of attack.

In sensor applications, where the sensor is an advertiser using advertisement packets to send out data, e.g. temperature information to a scanner device collecting the data, the sensor cannot be authenticated without being connected to the data collector.

In accordance with an example embodiment of the invention, information is exchanged before connection is established between advertiser and scanner devices, in advertising packets and scan response packets, to authenticate the advertiser device and/or the scanner device.

FIG. 1A is an illustration of an example embodiment of a network with an example wireless advertiser device 102 and a wireless scanner device 100. The wireless scanner device 100 is shown scanning for Bluetooth™ Low Energy protocol (BLE) advertising messages 150. The advertiser device 102 is shown generating a nonce, at 160, to be used to authenticate other devices. The nonce may be generated by the advertiser device, as a random or a pseudorandom number that should be used only once and thus shall not be repeated. The nonce is used in challenge-response authentication as a challenge and the other party must provide a valid answer for response to be authenticated. The advertiser device 102 is shown broadcasting BLE advertising messages 150 over any of the 3 advertising PHY channels used by devices to advertise their existence and capabilities. The wireless advertiser device 102 is in the process of authenticating the wireless scanner device 100 by transmitting BLE advertising messages 150 including a nonce for authenticating wireless devices responding to the advertising messages, in accordance with at least one embodiment of the present invention.

The scanner device 100 is shown receiving the advertising messages 150, extracting the nonce, and computing an authentication test value based on the nonce. The authentication test value may be generated by cryptographically combining the nonce with a shared secret value or key 130. For example, the nonce may be exclusive-ORed with the shared secret key 130 to generate an authentication test value. An authentication test value may also be generated with a cryptographic hash function operating on the nonce. The cryptographic hash function converts the digital string of the nonce into a fixed-length hash value or digest, which is the authentication test value. A cryptographic hash function, such as MD5 or SHA-1, may be used in the calculation of the authentication test value. An authentication test value or message authentication code may also be generated with a block cipher algorithm operating on the nonce. The block cipher converts fixed-length groups of bits, called blocks or plaintext, to ciphertext which can be transformed back into the original plaintext using the same encryption key. The nonce can be used as an initialization vector or plaintext for block cipher algorithm. Block ciphers, such as AES-128, AES-192 and AES-256, may be used in the calculation of an authentication test value. For example, the scanner computes, at 162, the authentication test value, which is a hash digest expressed as HASH[NONCE & SECRET KEY], where the nonce value and secret key value may be concatenated and used as the argument in the cryptographic hash function.

Figure 9:
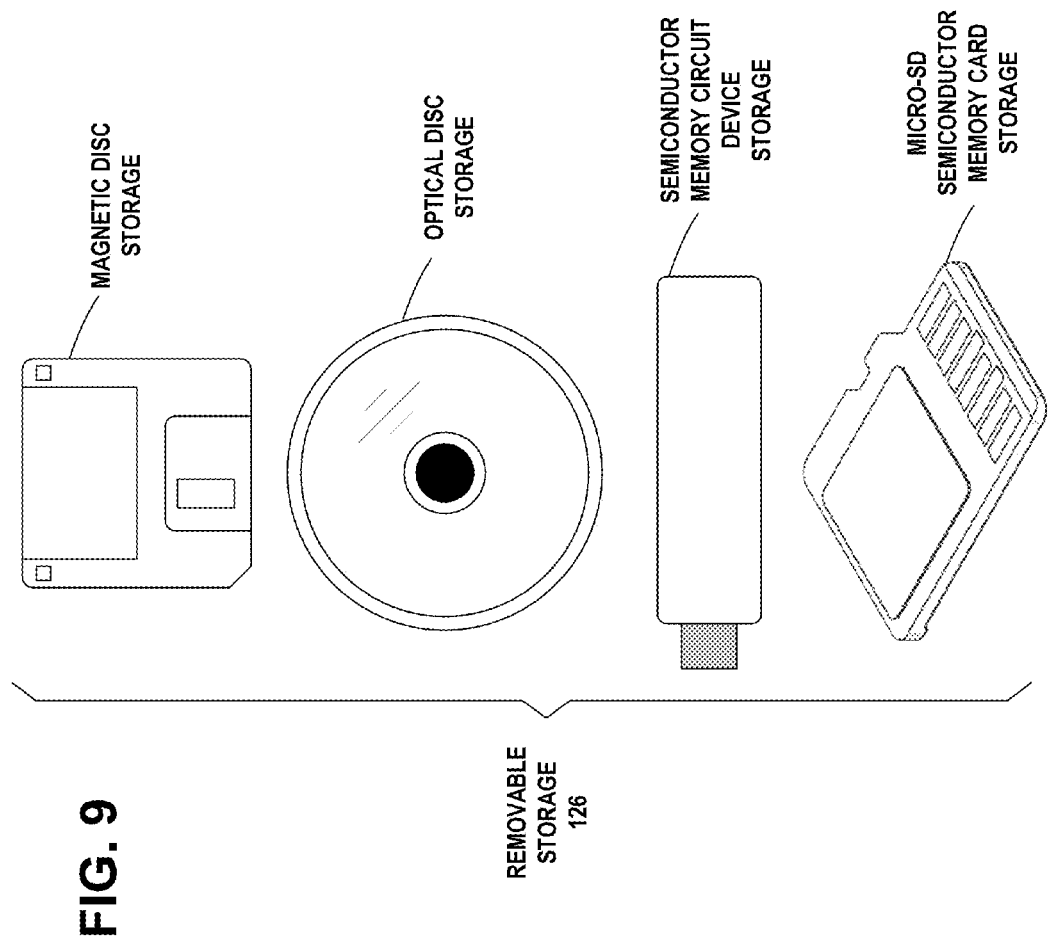
FIG. 9 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In example embodiments of the invention, the scanner device 100 and the advertiser device 102 may include a processor 122 that includes from one to many central processing units (CPUs) 124 and/or 125, a random access memory (RAM)/a read only memory (ROM) 126, and interface circuits to interface with one or more radio transceivers 116, antenna 132, 170, and battery or house power sources. The wireless mobile device 100 may include a keypad, display 142, etc. The RAM and ROM can be removable memory devices such as smart cards, SIMs, WIMs, semiconductor memories such as RAM, ROM, PROMS, flash memory devices, etc., as shown in FIG. 9. In an example embodiment of the invention, the RAM 126 or buffer 162 in the scanner device 100 may store the default service information contained in received advertising messages 150, for example, a description of the capabilities of the sending device 102 in received advertising messages 150.

In an example embodiment of the invention, the Bluetooth scanner device 100 and the wireless device 102 include the Bluetooth™ Low Energy protocol (BLE) 114.

In an example embodiment of the invention, the scanner device 100 and/or the advertiser device 102 may be, for example, a miniature device such as a key fob, smart card, jewelry, or the like. In an example embodiment of the invention, the scanner device 100 and/or the advertiser device 102 may be, for example, a relatively larger cell phone, smart phone, flip-phone, PDA, graphic pad. The scanner device 100 and/or the advertiser device 102 may also be in an automobile or other vehicle. In embodiments, the relative sizes of devices 100 and 102 may be arbitrary.

FIG. 1B is an illustration of an example embodiment of the network of FIG. 1A. The wireless scanner device computes an authentication test value that is based on output of the security function utilizing at least a combination of the nonce and a secret value shared by the wireless advertiser device and the wireless scanner device. The example of the authentication test value can be output of the hash function or the block cipher algorithm.

The scanner device 100 sends an extended scan request message 152 to the advertiser device 102, including the authentication test value HASH[NONCE & SECRET KEY], based on the nonce. In parallel, the advertiser device 102 computes another copy of HASH[NONCE & SECRET KEY], using its own stored values of the nonce and the shared secret key. The advertiser device 102 then compares the computed authentication test value with the received authentication test value from the scanner device 100. The advertiser device 102 can then authenticate the wireless scanner device 100, if the computed authentication test value compares with the received authentication test value, in accordance with at least one embodiment of the present invention.

Figure 2A:
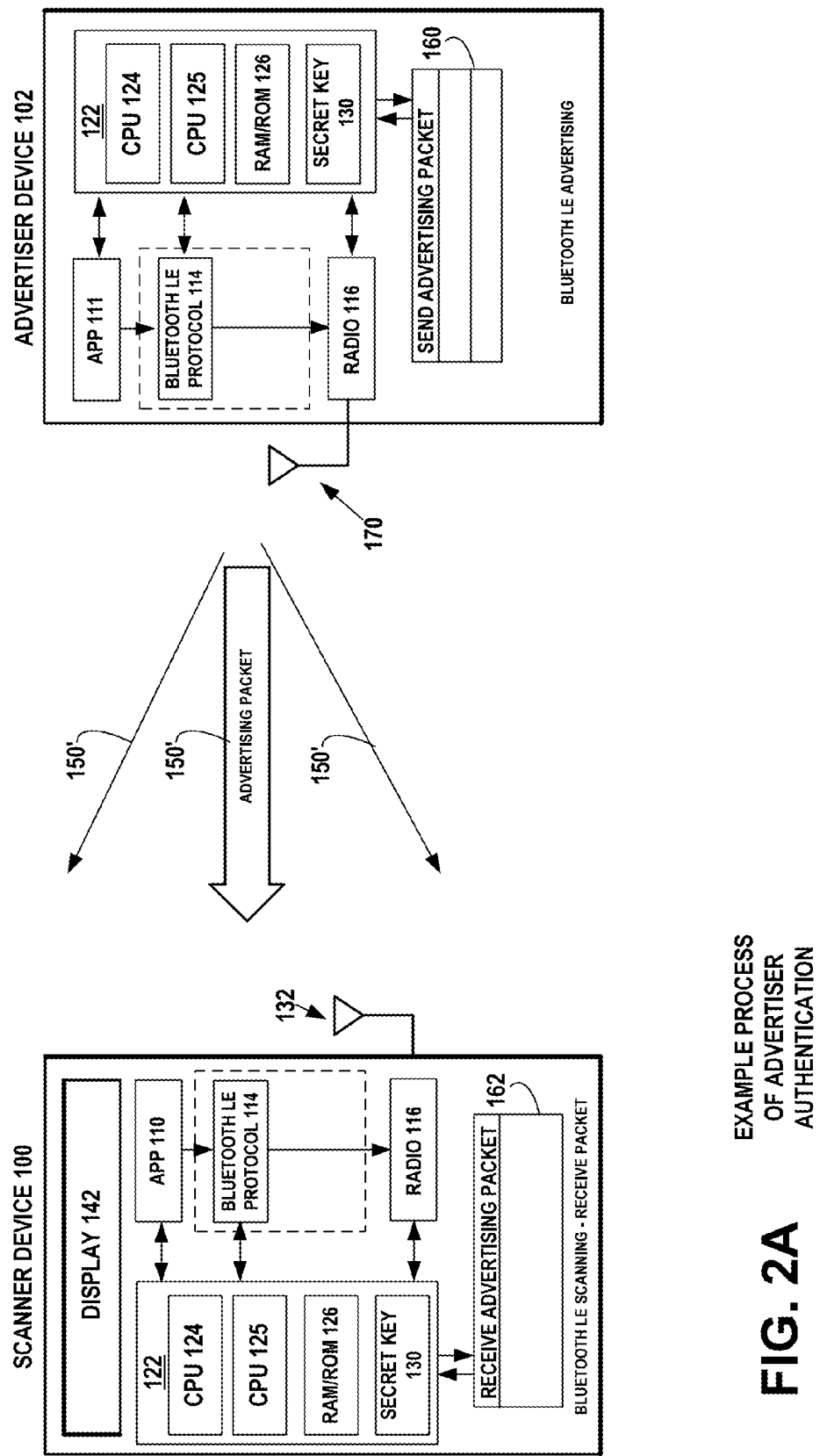
FIG. 2A is an illustration of an example embodiment of the network of FIG. 1A, wherein the wireless scanner device is shown scanning for Bluetooth™ Low Energy protocol (BLE) advertising messages and the wireless advertiser device is shown transmitting BLE advertising messages, in accordance with at least one embodiment of the present invention.

FIG. 2A is an illustration of an example embodiment of the network of FIG. 1A, wherein the wireless scanner device 100 is shown scanning for Bluetooth™ Low Energy protocol (BLE) advertising messages 150' and the wireless advertiser device 102 is shown transmitting BLE advertising messages 150', in accordance with at least one embodiment of the present invention.

FIG. 2B is an illustration of an example embodiment of the network of FIG. 2A, wherein the wireless scanner device 100 is shown generating a nonce to be used to authenticate the advertising device 102. The wireless scanner device 100 is in the process of authenticating the wireless advertiser device 102 by transmitting BLE extended scan request messages 152' including the nonce for authenticating responding wireless devices, in accordance with at least one embodiment of the present invention. The wireless advertiser device 102 receives the extended scan request messages 152' and extracts the nonce. The wireless advertiser device 102 then computes an authentication test value HASH [NONCE & SECRET KEY], which is a hash value of a combination of the received nonce and the secret value or key 130 shared by the wireless advertiser device 102 and the wireless scanner device 100, in accordance with at least one embodiment of the present invention.

FIG. 2C is an illustration of an example embodiment of the network of FIG. 2B, wherein the wireless advertiser device 102 sends a scan response message 154' including the authentication test value HASH[NONCE & SECRET KEY], to the scanner device 100. In parallel, the scanner device 100 computes another copy of HASH[NONCE & SECRET KEY], using its own stored values of the nonce and the shared secret key. The scanner device 100 then compares the computed authentication test value with the received authentication test value from the advertiser device 102. The scanner device 100 can then authenticate the wireless advertiser device 102, if the computed authentication test value compares with the received authentication test value, in accordance with at least one embodiment of the present invention.

Figure 3A:
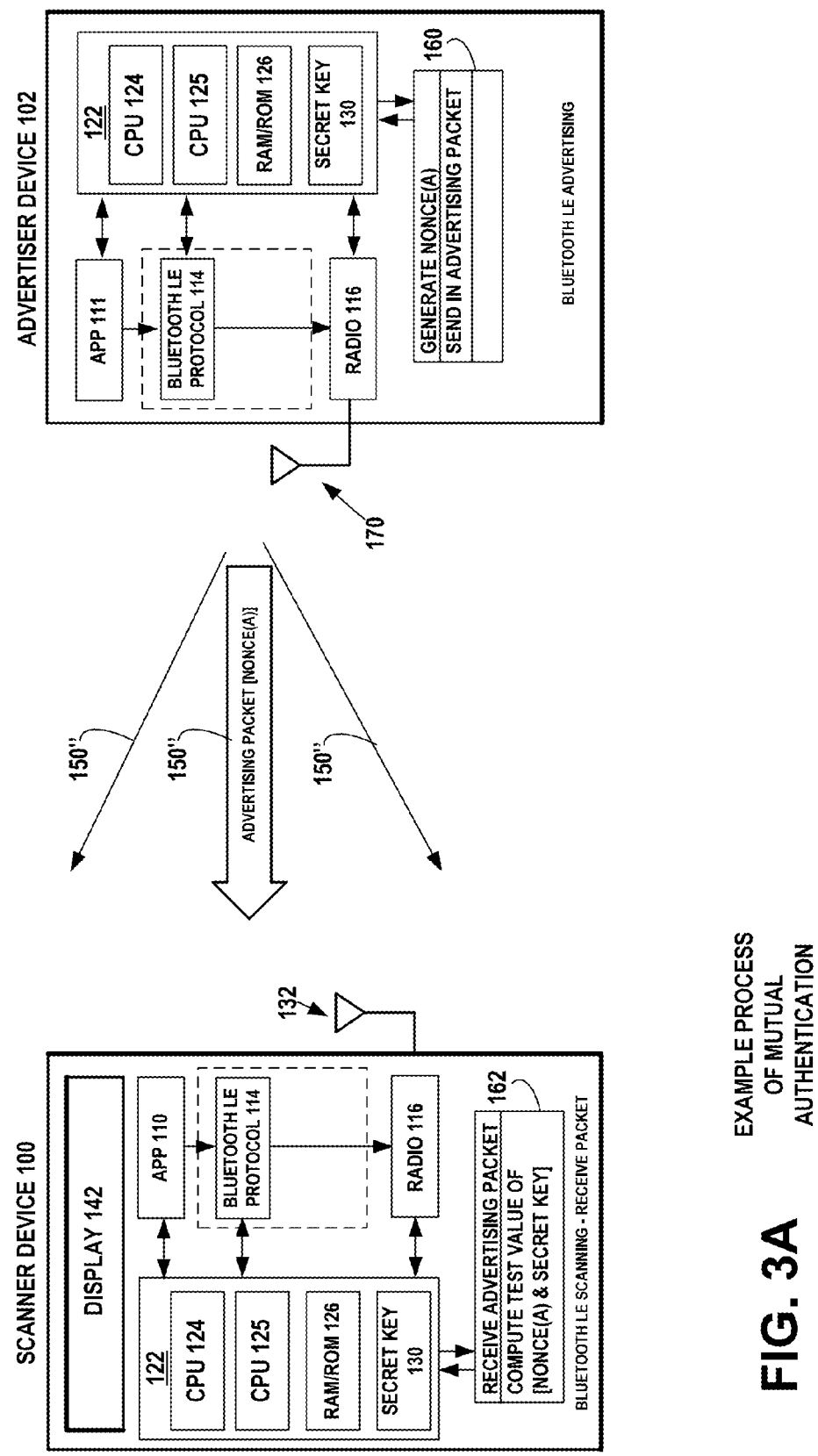
FIG. 3A is an illustration of an example embodiment of the network of FIG. 1A, wherein the advertiser device and the scanner device mutually authenticate each other. The advertiser device is shown transmitting advertisement messages including a first nonce for authenticating wireless devices responding to the advertisement messages. The scanner receives the advertisement packet and computes a first authentication test value based on the first nonce, in accordance with at least one embodiment of the present invention.

FIG. 3A is an illustration of an example embodiment of the network of FIG. 1A, wherein the advertiser device 102 and the scanner device 100 mutually authenticate each other. The advertiser device 102 is shown generating a first nonce, NONCE(A), to be used to authenticate other devices. The advertiser device 102 is shown transmitting advertisement messages 150" including the first nonce, NONCE(A), for authenticating wireless devices responding to the advertisement messages 150". The scanner device 100 receives the advertisement packet 150", extracts NONCE(A), and computes a first authentication test value HASH[NONCE(A) & SECRET KEY], based on the received nonce, in accordance with at least one embodiment of the present invention.

FIG. 3B is an illustration of an example embodiment of the network of FIG. 3A, wherein the wireless scanner device 100 is shown generating a second nonce, NONCE(B), to be used to authenticate the advertising device 102. The scanner device 100 transmits an extended scan request message 152" to the advertising device 102, including the first authentication test value HASH[NONCE(A) & SECRET KEY], based on the first nonce, NONCE(A), and in a separate field of the message, the second nonce, NONCE(B), for authenticating the advertiser device 102.

In parallel, the advertiser device 102 computes another copy of HASH[NONCE(A) & SECRET KEY], using its own stored values of the nonce and the shared secret key. The advertiser device 102 then compares the computed authentication test value with the received authentication test value from the scanner device 100. The advertiser device 102 can then authenticate the wireless scanner device 100, if the computed authentication test value compares with the received authentication test value, in accordance with at least one embodiment of the present invention.

FIG. 3C is an illustration of an example embodiment of the network of FIG. 3B, wherein the wireless advertiser device 102 has extracted the second nonce, NONCE(B), from the received extended scan request message 152" and computes a second authentication test value HASH [NONCE(B) & KEY], based on the second nonce, NONCE(B). In example embodiments, the second authentication test value may also be based on the first NONCE(A), in addition to NONCE(B). If the comparison with the hash from the scanner 100 is successful, then the advertiser device 102 will transmit to the scanner device 100, the scan response message 154", including the second authentication test value HASH [NONCE(B) & KEY] based on the second nonce, NONCE(B), to enable the scanner device 100 to authenticate the advertiser device 102 without establishing a wireless connection to the advertiser device 102.

In parallel, the scanner device 100 computes another copy of HASH[NONCE(B) & SECRET KEY], using its own stored values of the second nonce, NONCE(B), and the shared secret key. The scanner device 100 then compares the computed authentication test value with the received authentication test value from the advertiser device 102. The scanner device 100 can then authenticate the wireless advertiser device 102, if the computed authentication test value compares with the received authentication test value, in accordance with at least one embodiment of the present invention.

Figure 4A:
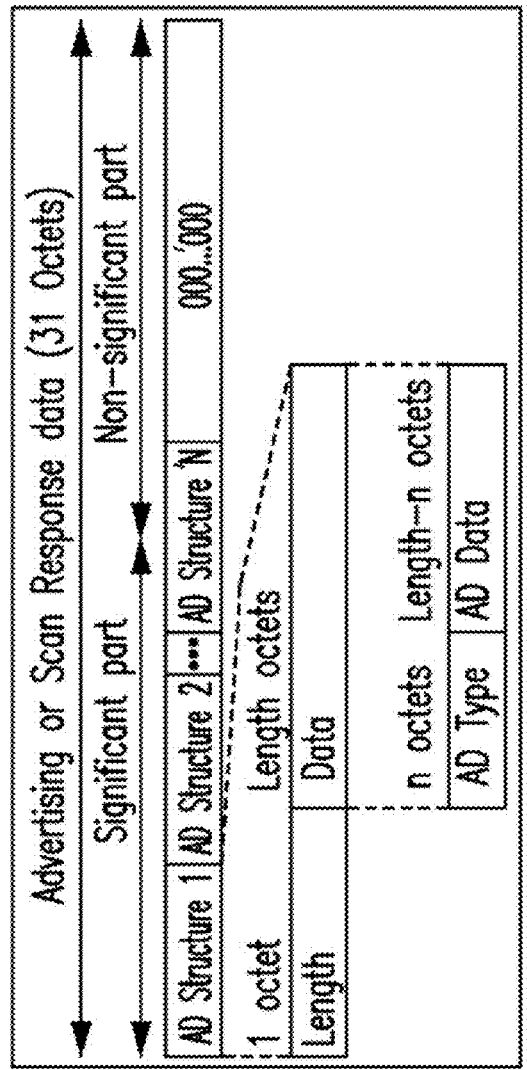
FIG. 4A is an illustration of an example format for the Bluetooth Low Energy advertising data and scan Response data, in accordance with at least one embodiment of the present invention.

FIG. 4A is an illustration of an example format for the Bluetooth Low Energy advertising data and scan Response data. The data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length−1 octet in the Data field depends on the value of the AD type field and is called the AD data. The non-significant part extends the Advertising and Scan Response data to 31 octets and shall contain all-zero octets. Only the significant part of the Advertising or Scan Response data needs to be sent over the air. The Advertising and Scan Response data is sent in advertising events. The Advertising Data is placed in the AdvData field of ADV_IND, ADV_NONCONN_IND, and ADV_SCAN_IND packets. The Scan Response data is sent in the ScanRspData field of SCAN_RSP packets.

Figure 4B:
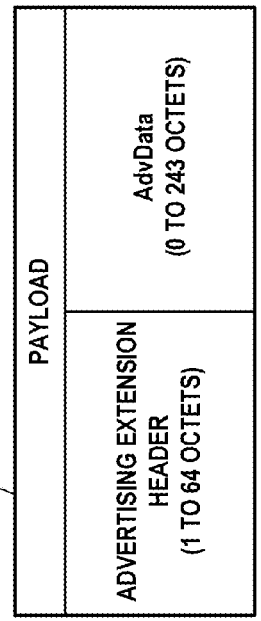
FIG. 4B is an illustration of an example format for the Bluetooth Low Energy Extended Advertising Packet Structure of the EXT_ADV_IND, EXT_SCAN_REQ and EXT_SCAN_RSP identical packets, in accordance with at least one embodiment of the present invention.

FIG. 4B is an illustration of an example format for the Bluetooth Low Energy Extended Advertising Packet Structure of the extended scan request packet 152, EXT_SCAN_REQ. The extended scan response packet EXT_SCAN_RSP packet and the extended advertising packet EXT_ADV_IND have a format that is identical to the extended scan request packet, EXT_SCAN_REQ. Each packet type has an Advertising Extension Header field of from 1 to 64 octets and AdvData field of from 0 to 243 octets, as illustrated in the figure.

FIG. 5A is an illustration of an example flow diagram 500 of an example process in the wireless advertiser device 102, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 502: transmitting, by an apparatus, wireless device discovery messages including a nonce for authenticating wireless devices responding to the wireless device discovery messages;

Step 504: receiving, by the apparatus, a wireless response message from another wireless device responding to the wireless device discovery messages, the wireless response message including an authentication test value based on the nonce; and Step 506: authenticating, by the apparatus, the other wireless device, without establishing a wireless connection to the other wireless device, if the authentication test value is valid.

FIG. 5B is an illustration of an example flow diagram 520 of an example process in the wireless scanner device 100, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 522: receiving, by an apparatus, wireless device discovery messages from another wireless device;

Step 524: transmitting, by the apparatus to the other wireless device, a wireless message responding to the wireless device discovery messages, the wireless message including a nonce for authenticating the other wireless device;

Step 526: receiving, by the apparatus, a wireless response message from the other wireless device, including an authentication test value based on the nonce; and Step 528: authenticating, by the apparatus, the other wireless device, without establishing a wireless connection to the other wireless device, if the authentication test value is valid.

FIG. 5C is an illustration of an example flow diagram 540 of an example process in the wireless advertiser device 102, carrying out mutual authentication operations with the scanner device 100, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 542: transmitting, by an apparatus, wireless device discovery messages including a first nonce for authenticating wireless devices responding to the wireless device discovery messages;

Step 544: receiving, by the apparatus, a wireless response message from another wireless device responding to the wireless device discovery messages, the wireless response message including a first authentication test value based on the first nonce and a second nonce for authenticating the apparatus;

Step 546: transmitting, by the apparatus, to the other wireless device, a wireless response message, including a second authentication test value based on the second nonce, to enable the other device to authenticate the apparatus without establishing a wireless connection to the apparatus; and Step 548: authenticating, by the apparatus, the other wireless device, without establishing a wireless connection to the other wireless device, if the first authentication test value is valid.

FIG. 5D is an illustration of an example flow diagram 560 of an example process in the wireless scanner device 100, carrying out mutual authentication operations with the advertiser device 102, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 562: receiving, by an apparatus, wireless device discovery messages from another wireless device, including a first nonce;

Step 564: transmitting, by the apparatus to the other wireless device, a wireless message responding to the wireless device discovery messages, the wireless message including a first test value based on the first nonce and a second nonce for authenticating the apparatus;

Step 566: receiving, by the apparatus, a wireless response message from the other wireless device, including a first authentication test value based on the first nonce and the second nonce for authenticating the apparatus;

Step 568: transmitting, by the apparatus, to the other wireless device, a wireless response message, including a second authentication test value based on the second nonce, to enable the other device to authenticate the apparatus without establishing a wireless connection to the apparatus; and Step 570: authenticating, by the apparatus, the other wireless device, without establishing a wireless connection to the other wireless device, if the first authentication test value is valid.

Figure 6B:
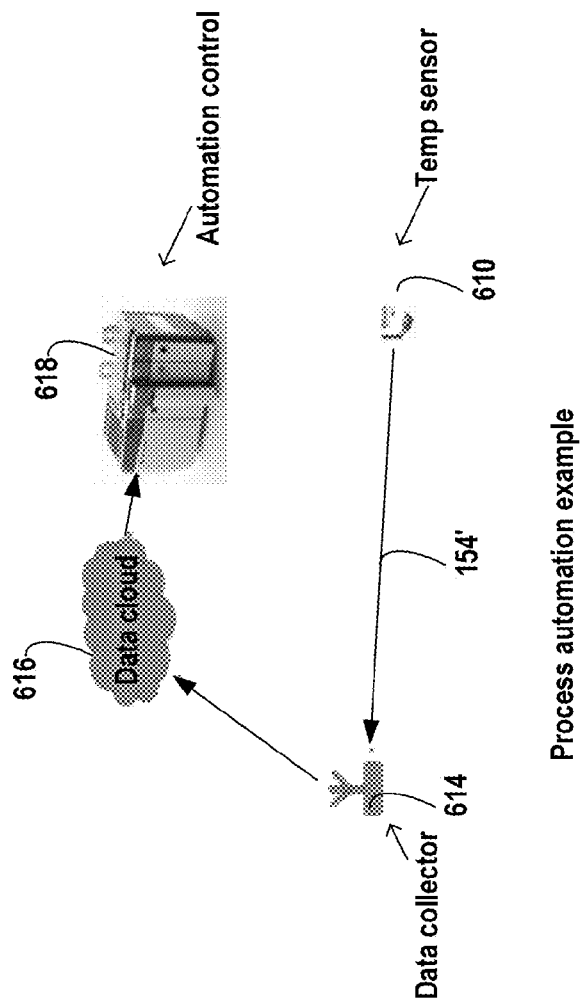
FIG. 6B is an example use case of a temperature sensor network, in accordance with at least one embodiment of the present invention.
Figure 6A:
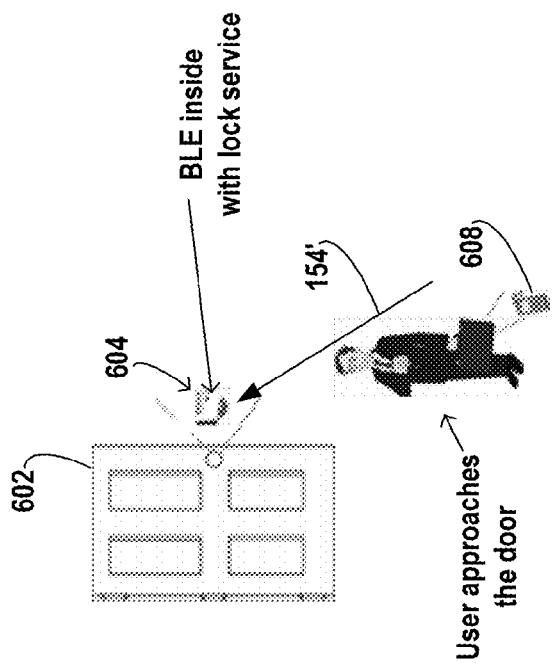
FIG. 6A is an example use case of an electronic door lock, in accordance with at least one embodiment of the present invention.

FIG. 6A is an example use case of a wireless electronic door lock 604 for a door 602, in accordance with at least one embodiment of the present invention. To actuate the wireless electronic door lock 604 with a mobile wireless device 608, the two devices must be initially paired. The device pairing operation includes the devices sharing a secret key, SECRET KEY. In use, the door lock 604 operates as a BLE scanner device and the mobile wireless device 608 operates as a BLE advertiser. When the door lock 604 receives advertising packets 150' (FIG. 2A) from the mobile wireless device 608, the door lock has been programmed to authenticate the mobile wireless device 608 by sending a nonce, NONCE, to the mobile wireless device 608 in an extended scan request packet 152' (FIG. 2B). The mobile wireless device 608 responds with a scan response packet 154' (FIG. 2C), including an authentication test value HASH[NONCE & SECRET KEY], to the door lock 604. In parallel, the door lock 604 computes another copy of HASH[NONCE & SECRET KEY], using its own stored values of the NONCE and SECRET KEY. The door lock 604 then compares the computed authentication test value with the received authentication test value from the mobile wireless device 608. The door lock 604 can then authenticate the mobile wireless device 608, if the computed authentication test value compares with the received authentication test value, in accordance with at least one embodiment of the present invention. If the authentication failed and if an attempted forced entry were to follow, the door lock 604 can have been programmed to black list the device address of the wireless mobile device 608, for example by not sending an extended scan request packet with a nonce the next time the mobile wireless device 608 attempts to activate the door lock 604.

FIG. 6B is an example use case of a temperature sensor network, in accordance with at least one embodiment of the present invention. A temperature sensor 610 operates as a BLE advertiser and a data collector 614 operates as a BLE scanner. The temperature sensor 610 sends temperature measurement data in advertising packets 150' (FIG. 2A). The data collector 614 has been programmed to authenticate the temperature sensor 610 by sending a nonce, NONCE, to the temperature sensor 610 in an extended scan request packet 152' (FIG. 2B). The temperature sensor 610 responds with a scan response packet 154' (FIG. 2C), including an authentication test value HASH[NONCE & SECRET KEY], to the data collector 614. In parallel, the data collector 614 computes another copy of HASH[NONCE & SECRET KEY], using its own stored values of the NONCE and SECRET KEY. The data collector 614 then compares the computed authentication test value with the received authentication test value from the temperature sensor 610. The data collector 614 can then authenticate the temperature sensor 610, if the computed authentication test value compares with the received authentication test value, in accordance with at least one embodiment of the present invention. The data collector 614 may then report the temperature data via the data cloud 616, to the automation control 618.

Figure 7A:
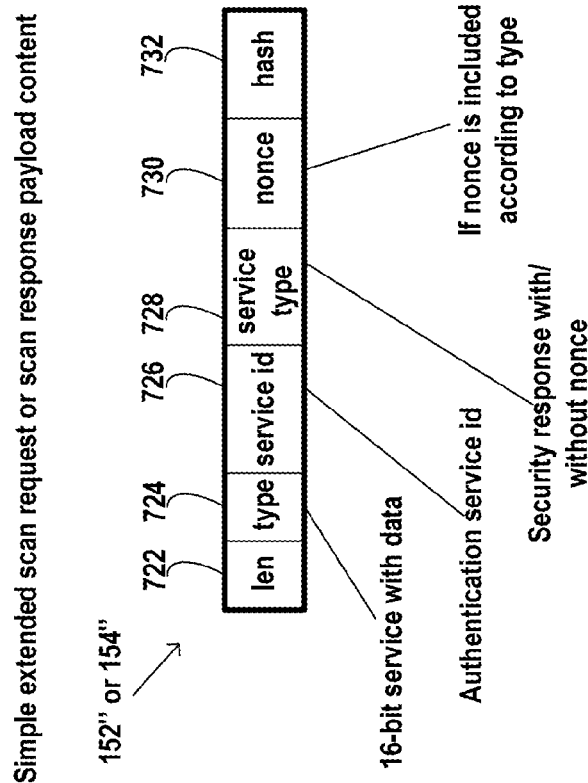
FIG. 7A is an example advertisement packet payload content with a Nonce, in accordance with at least one embodiment of the present invention.

FIG. 7A is an example AD structure of the advertisement data in the advertisement packet 150, with payload content including a Nonce, in accordance with at least one embodiment of the present invention. Field 702 contains the length of the AD structure. Field 704 identifies the type of the packet, which is 16-bit service with data. Field 706 contains the service ID, which is authentication service. Field 708 contains the service type, which is security nonce. And, field 710 contains the nonce value.

Figure 7B:
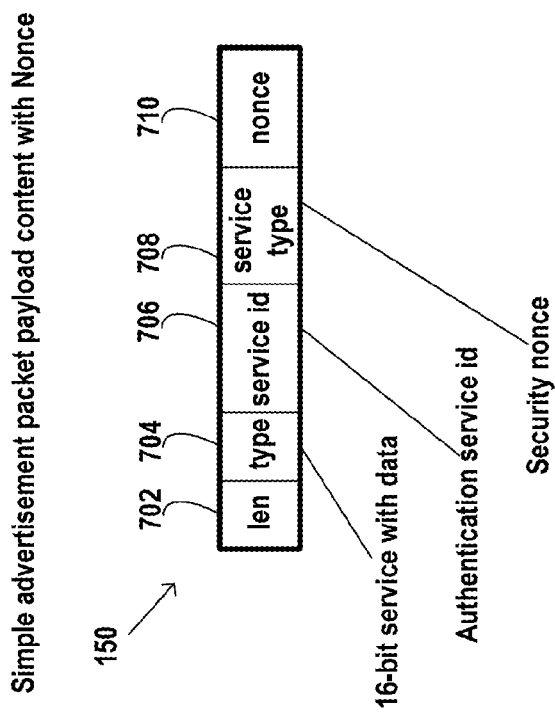
FIG. 7B is an example extended scan request or response payload content, in accordance with at least one embodiment of the present invention.

FIG. 7B is an example AD structure of the extended scan request 152" or scan response 154" payload content, in accordance with at least one embodiment of the present invention. Field 722 contains the length of the AD structure. Field 724 identifies the type of the packet, which is 16-bit service with data. Field 726 contains the service ID, which is authentication service. Field 728 contains the service type, which is security response either with (packet 152") or without (packet 154") a nonce. Field 730 contains the nonce value, NONCE (if this type is to include a nonce value). Field 732 includes the authentication test value HASH [NONCE & SECRET KEY].

Figure 8:
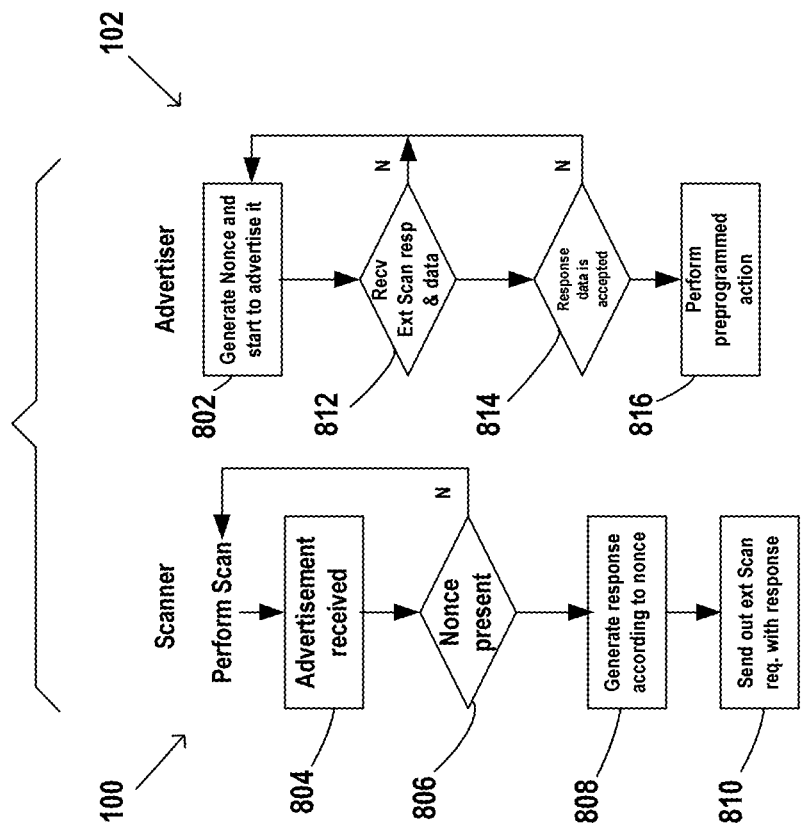
FIG. 8 is an example flow diagram of a process for scanner authorization, in accordance with at least one embodiment of the present invention.

FIG. 8 is an example flow diagram of a process for scanner authorization, in accordance with at least one embodiment of the present invention. The figure shows parallel operation of the scanner device 100 and the advertiser device 102 in the process of scanner authorization, n the following steps.

Step 802: The advertiser device 102 is shown generating a nonce to be used to authenticate other devices. The advertiser device is broadcasting BLE advertising messages over any/all of the 3 advertising PHY channels used by devices to advertise their existence and capabilities.

Step 804: The scanner device 100 is receiving the advertising messages.

Step 806: The scanner device 100 is extracting the nonce, and computing an authentication test value based on the nonce.

Step 808: The scanner device 100 generates an extended scan request message.

Step 810: The scanner device 100 sends the extended scan request message to the advertiser device 102, including the authentication test value HASH[NONCE & SECRET KEY], based on the nonce.

Step 812: The advertiser 102 receives the extended scan request message.

Step 814: The advertiser device 102, in parallel, computes another copy of HASH[NONCE & SECRET KEY], using its own stored values of the nonce and the shared secret key. The advertiser device 102 then compares the computed authentication test value with the received authentication test value from the scanner device 100. The advertiser device 102 can then authenticate the wireless scanner device 100, if the computed authentication test value compares with the received authentication test value, in accordance with at least one embodiment of the present invention.

Step 816: The advertiser performs preprogrammed action.

FIG. 9 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable non-transitory media such as resident memory devices, smart cards or other removable memory devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
    transmitting, by an apparatus, wireless device discovery messages including a nonce for authenticating wireless devices responding to the wireless device discovery messages;
    receiving, by the apparatus, a wireless response message from another wireless device responding to the wireless device discovery messages, the wireless response message including an authentication test value based on the nonce;

authenticating, by the apparatus, the other wireless device, without establishing a wireless connection to the other wireless device, if the authentication test value is valid;

wherein the authentication test value received from the other wireless device is a received value of a combination of the nonce and a secret value shared by the wireless device and the other wireless device;

wherein the authenticating further comprises:

computing, by the apparatus, an authentication test value based on the nonce and the shared secret value;

comparing, by the apparatus, the computed authentication test value with the received authentication test value; and authenticating, by the apparatus, the other wireless device, if the computed authentication test value compares with the received authentication test value.

2. The method of claim 1, wherein the wireless device discovery messages transmitted by the wireless device are Bluetooth Low Energy advertising messages and the wireless response message from other wireless device is a Bluetooth Low Energy extended scan request.

3. A method, comprising:

receiving, by an apparatus, wireless device discovery messages from another wireless device;

transmitting, by the apparatus to the other wireless device, a wireless message responding to the wireless device discovery messages, the wireless message including a nonce for authenticating the other wireless device;

receiving, by the apparatus, a wireless response message from the other wireless device, including an authentication test value based on the nonce;

authenticating, by the apparatus, the other wireless device, without establishing a wireless connection to the other wireless device, if the authentication test value is valid;

wherein the authenticating further comprises:

computing, by the apparatus, an authentication test value based on the nonce and the shared secret value;

comparing, by the apparatus, the computed authentication test value with the received authentication test value; and authenticating, by the apparatus, the other wireless device, if the computed authentication test value compares with the received authentication test value.

4. The method of claim 3, wherein the wireless device discovery messages transmitted by the other wireless device are Bluetooth Low Energy advertising messages and the wireless message transmitted by the apparatus and including the nonce, is a Bluetooth Low Energy extended scan request.

5. The method of claim 3, wherein the authentication test value received from the other wireless device is a received value of a combination of the nonce and a secret value shared by the wireless device and the other wireless device.

6. An apparatus, comprising:

at least one processor;

at least one memory including computer program code;

the at least one memory and the computer program code configured to, with the at least one processor, cause the apparatus at least to:

transmit wireless device discovery messages including a nonce for authenticating wireless devices responding to the wireless device discovery messages;

receive a wireless response message from another wireless device responding to the wireless device discovery messages, the wireless response message including an authentication test value based on the nonce;

authenticate the other wireless device, without establishing a wireless connection to the other wireless device, if the authentication test value is valid;

wherein the authentication test value received from the other wireless device is a received value of a combination of the nonce and a secret value shared by the wireless device and the other wireless device;

wherein the authentication further comprises:

the at least one memory and the computer program code configured to, with the at least one processor, cause the apparatus at least to:

compute an authentication test value based on the nonce and the shared secret value;

compare the computed authentication test value with the received authentication test value; and authenticate the other wireless device, if the computed authentication test value compares with the received authentication test value.

7. The apparatus of claim 6, wherein the wireless device discovery messages transmitted by the wireless device are Bluetooth Low Energy advertising messages and the wireless response message from other wireless device is a Bluetooth Low Energy extended scan request.

8. An apparatus, comprising:

at least one processor;

at least one memory including computer program code;

the at least one memory and the computer program code configured to, with the at least one processor, cause the apparatus at least to:

transmit wireless device discovery messages including a first nonce for authenticating wireless devices responding to the wireless device discovery messages;

receive a wireless response message from another wireless device responding to the wireless device discovery messages, the wireless response message including a first authentication test value based on the first nonce and a second nonce for authenticating the apparatus;

transmit to the other wireless device, a wireless response message, including a second authentication test value based on the second nonce, to enable the other device to authenticate the apparatus without establishing a wireless connection to the apparatus; and authenticate the other wireless device, without establishing a wireless connection to the other wireless device, if the first authentication test value is valid.

9. The apparatus of claim 8, wherein the authentication further comprises:

the at least one memory and the computer program code configured to, with the at least one processor, cause the apparatus at least to:

compute an authentication test value based on the first nonce and a shared secret value;

compare the computed authentication test value with the received first authentication test value; and authenticate the other wireless device, if the computed authentication test value compares with the received first authentication test value.

10. The apparatus of claim 8, wherein the wireless device discovery messages transmitted by the wireless device are Bluetooth Low Energy advertising messages and the wireless response message from other wireless device is a Bluetooth Low Energy extended scan request.

11. An apparatus, comprising:

at least one processor;

at least one memory including computer program code;

the at least one memory and the computer program code configured to, with the at least one processor, cause the apparatus at least to:

receive wireless device discovery messages from another wireless device;

transmit to the other wireless device, a wireless message responding to the wireless device discovery messages, the wireless message including a first nonce for authenticating the other wireless device;

receive a wireless response message from the other wireless device, including a first authentication test value based on the first nonce and a second nonce for authenticating the apparatus;

transmit to the other wireless device, a wireless response message, including a second authentication test value based on the second nonce, to enable the other device to authenticate the apparatus without establishing a wireless connection to the apparatus; and authenticate the other wireless device, without establishing a wireless connection to the other wireless device, if the first authentication test value is valid.

12. The apparatus of claim 11, wherein the authentication further comprises:

the at least one memory and the computer program code configured to, with the at least one processor, cause the apparatus at least to:

compute an authentication test value based on the first nonce and a shared secret value;

compare the computed authentication test value with the received first authentication test value; and authenticate the other wireless device, if the computed authentication test value compares with the received first authentication test value.

13. The apparatus of claim 11, wherein the wireless device discovery messages transmitted by the other wireless device are Bluetooth Low Energy advertising messages and the wireless message transmitted by the apparatus and including the first nonce, is a Bluetooth Low Energy extended scan request.

14. The apparatus of claim 11, wherein the first authentication test value received from the other wireless device is a received value of a combination of the first nonce and a secret value shared by the wireless device and the other wireless device.

* * * * *